US011265353B2

(12) United States Patent
Seed et al.

(10) Patent No.: US 11,265,353 B2
(45) Date of Patent: Mar. 1, 2022

(54) AUTOMATED SERVICE ENROLLMENT IN A MACHINE-TO-MACHINE COMMUNICATIONS NETWORK

(71) Applicant: CONVIDA WIRELESS, LLC, Wilmington, DE (US)

(72) Inventors: Dale N. Seed, Allentown, PA (US); William Robert Flynn, IV, Schwenksville, PA (US); Quang Ly, North Wales, PA (US); Rocco Di Girolamo, Laval (CA); Zhuo Chen, Claymont, DE (US); Catalina Mihaela Mladin, Hatboro, PA (US); Shoshana Loeb, Philadelphia, PA (US); Mahmoud Watfa, Saint Leonard (CA); Michael F. Starsinic, Newtown, PA (US); Vinod Kumar Choyi, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/644,332

(22) PCT Filed: Sep. 7, 2018

(86) PCT No.: PCT/US2018/049893
§ 371 (c)(1),
(2) Date: Mar. 4, 2020

(87) PCT Pub. No.: WO2019/051187
PCT Pub. Date: Mar. 14, 2019

(65) Prior Publication Data
US 2020/0195696 A1    Jun. 18, 2020

Related U.S. Application Data

(60) Provisional application No. 62/556,161, filed on Sep. 8, 2017.

(51) Int. Cl.
*G06F 13/00* (2006.01)
*H04L 65/1073* (2022.01)
(Continued)

(52) U.S. Cl.
CPC ........ *H04L 65/1073* (2013.01); *H04L 67/303* (2013.01); *H04W 4/70* (2018.02)

(58) Field of Classification Search
CPC ............... H04L 65/1073; H04L 67/303; H04L 65/1066; H04L 65/00; H04L 67/30;
(Continued)

(56) References Cited

U.S. PATENT DOCUMENTS 10,448,449 B2 * 10/2019 Aravamudhan ........ H04L 12/14
10,812,345 B2 * 10/2020 Seed ........................ H04L 67/16
(Continued)

OTHER PUBLICATIONS

ETSI 102 690 V2.0.13 Technical Specification, "Machine-to-Machine Communications (M2M); Functional Architecture", May 2013, 328 pages.
(Continued)

*Primary Examiner* — Kenneth R Coulter
(74) *Attorney, Agent, or Firm* — BakerHostetler

(57) ABSTRACT

IoT service layer capabilities may be employed to automate and simplify the service enrollment process for IoT service subscribers/enrollees. These capabilities enable virtualization of a service subscriber and the physical IoT devices, applications, data and authorized users of the subscriber into a software profile that is representative of the subscriber. Once virtualized, a service subscriber may then delegate the complexities and burden of service enrollment to an automated IoT service enrollment software function.

18 Claims, 35 Drawing Sheets

(51) Int. Cl.
*H04W 4/70* (2018.01)
*H04L 67/303* (2022.01)

(58) Field of Classification Search
CPC ......... H04L 67/00; H04W 4/70; G16Y 40/30; G16Y 40/35; G16Y 40/40
USPC ...................... 709/230, 201; 718/1, 100, 102
See application file for complete search history.

(56) References Cited

U.S. PATENT DOCUMENTS

| | | | |
|---|---|---|---|
| 10,887,420 B2* | 1/2021 | Flynn, IV | H04L 69/08 |
| 2016/0227371 A1* | 8/2016 | Wang | H04W 4/70 |
| 2016/0277391 A1* | 9/2016 | Choyi | H04L 67/12 |
| 2019/0021121 A1* | 1/2019 | Aravamudhan | H04L 12/14 |

OTHER PUBLICATIONS

Ian Deakin et al., "Presentation of the AppID Registry Function" REQ-2017-0044, (http://member.onem2m.org/Application/documentapp/downloadimmediate/default.aspx?docID=22728), retrieved on May 7, 2017, 18 pages.

Nec, Cisco, Change Request, WG2, TP9, "Modification to the CREATE Procedure for Accommodating Registration", Jan. 2014, 8 pages.

OMA Open Mobile Alliance, "Lightweight Machine to Machine Technical Specification Candidate Version 1.0", Dec. 2013, 104 pages.

OneM2M Technical Report, TR-0048-V0.0.3, Shelby, et al., "oneM2M App-ID Registry Function", Dec. 2017, 29 pages.

OneM2M Technical Specification TS-0001-V3.5.0, "Functional Architecture", Apr. 2017, 461 pages.

OneM2M Technical Specification TS-0003 V3.0.0, "Security Solutions", Nov. 2016, 195 pages.

OneM2M Technical Specification, TS-0032 V0.0.4, "MAF and MEF Interface Specification", Apr. 2017, 32 pages.

Open Connectivity Foundation (OCF), "OIC Core Candidate Specification V1.1.0 Part 1", Copyright 2016, 183 pages.

Nec et al: "Updated the CREATE procedure for Application Registration", ARC-2014-0048-UPDATE-CREATE-REGISTRATI0N. DOC, ONEM2M, Jan. 21, 2014, pp. 1-8.

Shelby Kiewel et al: "Update to WI-0073/TR-0048 to move to completion", SEC-2018-0036R02-UPDATE To WI-0073 TR-0048_TO_MOVE_TO_COMPLETION.ZIP, ONEM2M, vol. WG4—Security, Mar. 15, 2018, pp. 1-29.

OneM2M Technical Specification TS-0001-V3.7.0, "Function Architecture," Aug. 16, 2017, 536 pages.

* cited by examiner

| | | | | | |
|---|---|---|---|---|---|
| Application(s) | Service Layer (SL) | Application Protocols (e.g. HTTP, COAP, MQTT) | Transport Protocols (e.g. TCP, UDP) | Network Protocols (e.g. IPv4/IPv6) | Access Network Protocols (e.g. Ethernet, Cellular, Wi-Fi) |

FIG. 2

AUTOMATED SERVICE ENROLLMENT IN A MACHINE-TO-MACHINE COMMUNICATIONS NETWORK

CROSS-REFERENCE TO RELATED APPLICATIONS

This application is the National Stage Application of International Patent Application No. PCT/US2018/049893, filed Sep. 7, 2018, which claims the benefit of U.S. Provisional Patent Application No. 62/556,161, filed Sep. 8, 2017, which is hereby incorporated by reference in its entirety.

BACKGROUND

A number of standards bodies, such as, for example, oneM2M, the European Telecommunications Standards Institute (ETSI), and the Open Connectivity Foundation (OCF), are developing machine-to-machine (M2M)/Internet-of-Things (IoT) service layers that define a single horizontal platform for the exchange and sharing of data among applications, even those from different industry sectors.

An M2M/IoT service layer may provide applications and devices access to a collection of M2M/IoT-oriented capabilities (M2M/IoT services) supported by the service layer. Such capabilities may be made available to applications via Application Programming Interfaces (APIs). For example, an M2M/IoT service layer may maintain massive amounts of M2M/IoT data, which may be discovered, retrieved, and/or subscribed-to by applications (provided those applications have suitable access rights). Additional examples of M2M/IoT services that may be provided by the service layer include security, charging, device management, provisioning, and connectivity management.

The oneM2M standard implements its service layer in the form of a "Common Service Entity (CSE)." The purpose of the oneM2M service layer is to provide "horizontal" services that can be utilized by different "vertical" M2M systems and applications. The oneM2M CSE supports four reference points. The Mca reference point interfaces with an Application Entity (AE). The Mcc reference point interfaces with another CSE within the same service provider domain and the Mcc' reference point interfaces with another CSE in a different service provider domain. The Mcn reference point interfaces with an underlying network service entity (NSE). An NSE provides underlying network services to the CSEs, such as device management, location services and device triggering. A CSE may contain multiple logical functions called "Common Service Functions (CSFs)", such as "Discovery" and "Data Management & Repository".

SUMMARY

Systems and methods are described herein to enable IoT service capabilities that may help automate and simplify the service enrollment process for IoT service enrollees and enable a more extensible IoT ecosystem to allow consumers to have the freedom to purchase and add various types of devices to their networks and the flexibility to discover and use services offered from various service providers. These capabilities may enable a human service enrollee to virtualize itself and his physical IoT devices, applications, data and authorized users (e.g., family members) into a software profile that is representative of the enrollee. Once virtualized, a service enrollee may then delegate the complexities and burden of service enrollment to an automated IoT service enrollment software function on its behalf. Likewise, these IoT service capabilities may also help automate the service enrollment process for IoT service providers and enable a service provider to virtualize itself and its enrollment process into an automated software enabled process. An architecture is also introduced for an IoT system that incorporates the newly introduced set of IoT service enrollment capabilities.

The following new capabilities are introduced herein: an IoT service capability and method to enable potential service enrollees to virtualize themselves and their IoT devices, applications, data and users into software entities that may then be enrolled with an IoT service provider's platform; an IoT service capability and method to enable IoT service providers to publish discoverable IoT service enrollment information via its distributed IoT services platform, which may also enable potential service enrollees to query and discover available service enrollment options that are published by a service provider via its IoT service platform; an IoT service capability and method to enable a service enrollee to establish a secure association with a service provider's platform and via this secure association securely enroll/re-enroll/dis-enroll with the service provider; and an IoT service capability and method to enable a virtualized IoT service enrollee to securely and dynamically enroll itself as well as its IoT devices, apps, data and authorized users to an IoT service provider's platform, which may enable an IoT service platform to provide an enrollee with a set of automated enrollment services such as auto creation of authorization policies for an enrollee, auto registration of an enrollee's IoT devices and applications and auto importing of an enrollees data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 2 illustrates an example protocol stack with a service layer between application protocols and applications;

DETAILED DESCRIPTION

Figure 1:
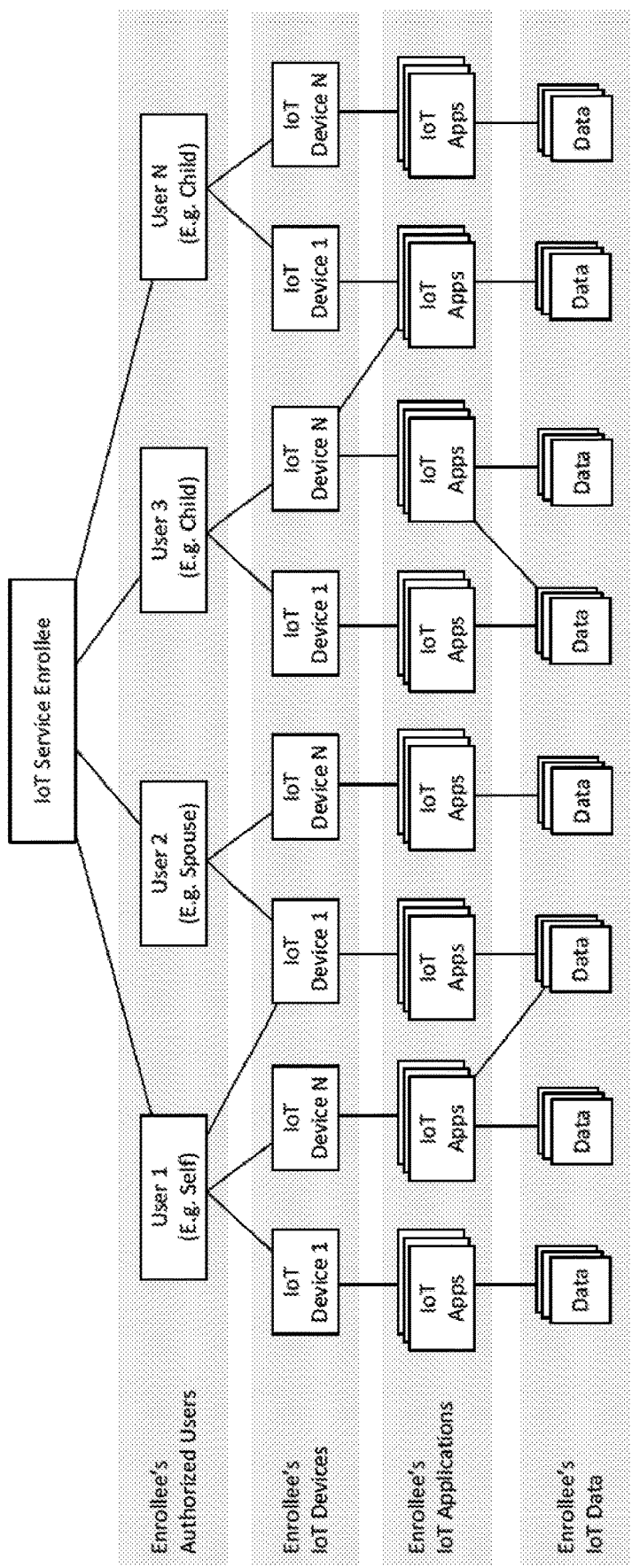
FIG. 1 illustrates a hierarchy of IoT service enrollee relationships.

IoT service enrollment enables an IoT service provider's platform to be informed of the relationships that exist between a service enrollee and its IoT devices, applications, data and authorized users as shown in FIG. 1. An IoT Service Enrollee may have multiple authorized users associated with it. These users may be authorized to access IoT devices. These devices may host IoT applications. The IoT applications may produce as well as consume data. Each enrollee may have one or more IoT devices, applications, users and/or data sets associated with it.

An IoT application may be a software entity that performs application specific functionality pertaining to IoT use cases (e.g., sensing, actuating).

An IoT service may be a software entity that provides capabilities to IoT applications and devices (e.g., data management, security, device management, etc.).

An IoT device may be an entity that may host one or more IoT applications.

An IoT entity may be an IoT application, IoT service or IoT device.

An IoT service platform may be a system that provides IoT services to its enrollee's and their IoT devices, applications, data and users on behalf of a service provider.

An IoT service provider may be a stakeholder (e.g., a company) responsible for the deployment and management of an IoT services platform.

An IoT service enrollee may be a stakeholder (e.g., a human being) that establishes a service enrollment with an IoT service provider's platform in order to access and use services of the IoT service provider's platform.

A virtualized IoT service enrollee may be a software profile that is representative of an IoT service enrollee and its IoT devices, applications, data and users.

An IoT service enrollment may be the act of an IoT service enrollee registering IoT devices, applications, data and authorized users to an IoT service provider in order to gain access to the services offered by the provider's IoT platform.

An IoT user may be an authorized user associated with an IoT service enrollee. An IoT service enrollee may grant specified privileges to specified users to access specified IoT devices, applications, data and services via the IoT service provider's platform.

An M2M/IoT Service Layer (SL) is a technology specifically targeted towards providing value-added services for M2M/IoT devices, IoT applications and IoT data. Recently, several industry standard bodies (e.g., oneM2M, ETSI, OCF and LWM2M) have been developing M2M/IoT SLs to address challenges associated with the integration of M2M/IoT devices, applications and data into deployments with the Internet/Web, cellular, enterprise, and home network.

An M2M/IoT SL may provide applications and devices access to a collection of M2M/IoT oriented capabilities. Example capabilities may include security, charging, data management, device management, discovery, provisioning, and connectivity management. Such capabilities may be made available to applications via APIs that make use of message formats, resource structures and resource representations supported by the M2M/IoT SL.

From a protocol stack perspective, SLs may typically be situated above the Application Protocol Layer and provide value added services to applications they support. Hence, SLs are often categorized as 'middleware' services. FIG. 2 illustrates an exemplary service layer between Application Protocols and Applications.

Figure 3:
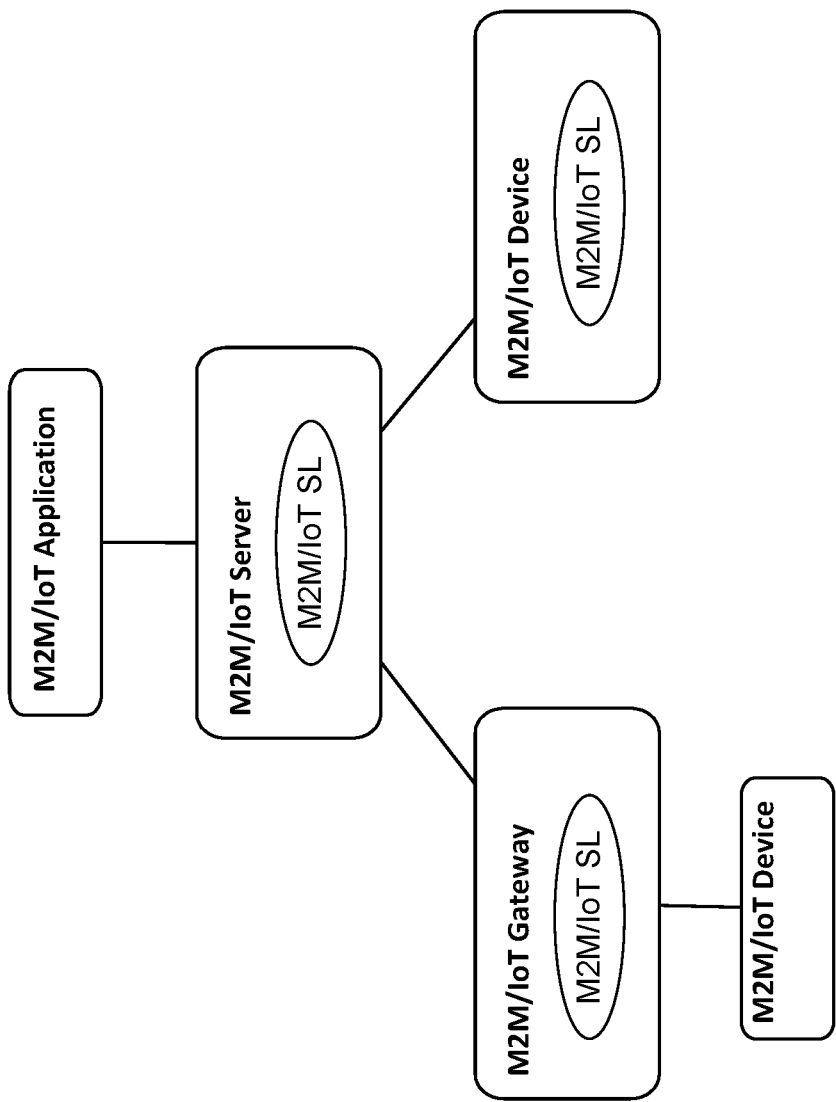
FIG. 3 illustrates an example M2M/IoT deployment.

From a deployment perspective, an M2M/IoT SL may be deployed on various types of network nodes including, for example, servers, gateways and devices, as shown in FIG. 3.

Figure 4:
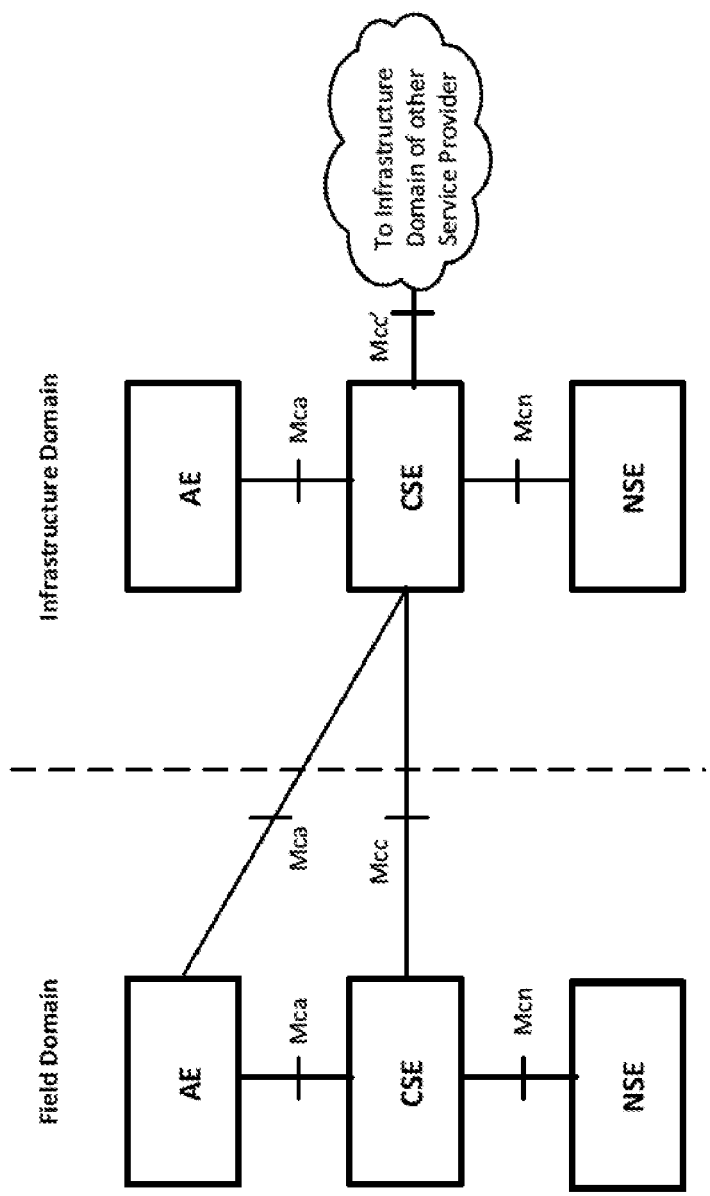
FIG. 4 illustrates an example oneM2M service layer architecture.
Figure 5:
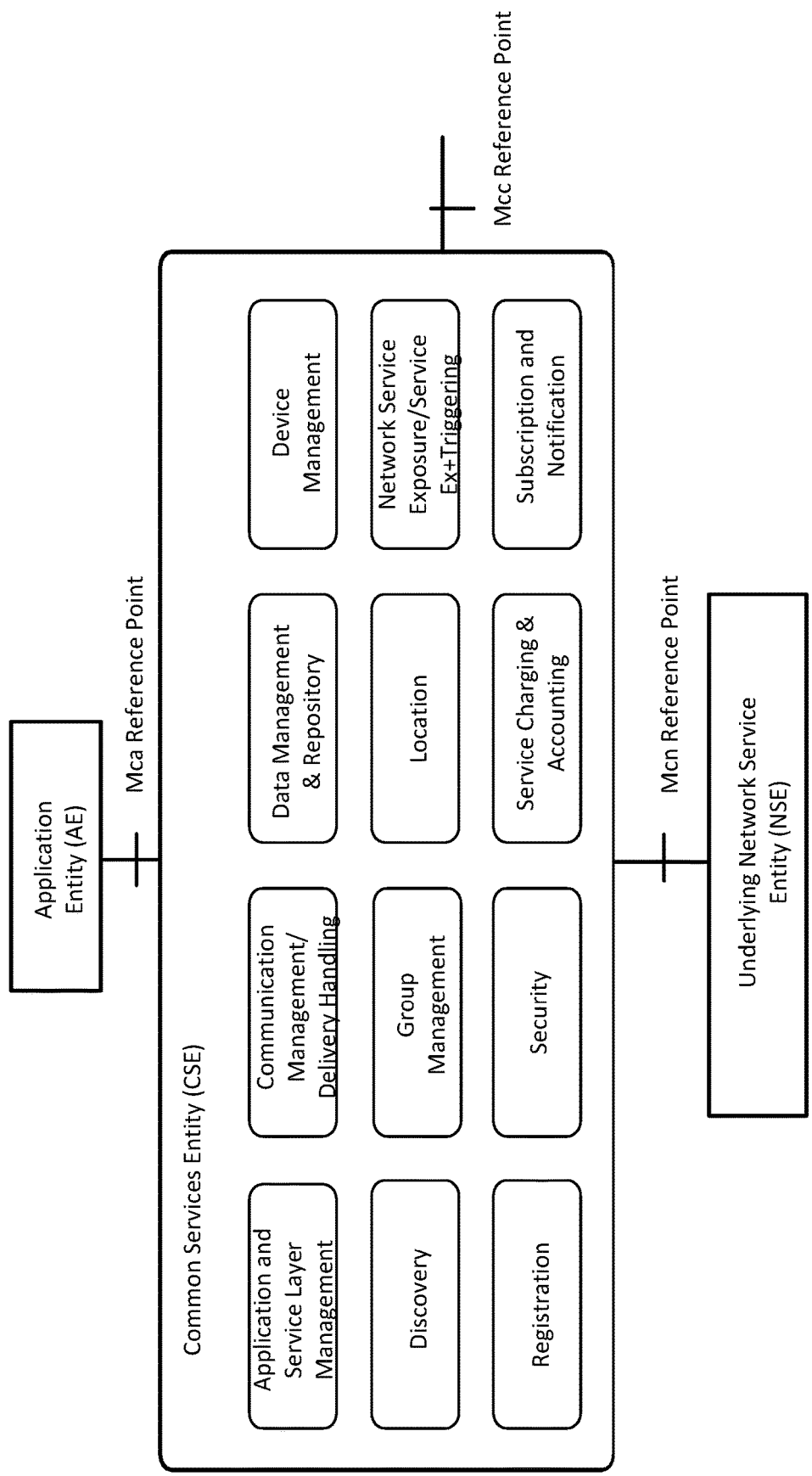
FIG. 5 illustrates CSFs currently defined by oneM2M.

The architecture of the oneM2M SL, as shown in FIG. 4, defines a Common Service Entity (CSE) that may support four reference points. The Mca reference point may interface with the Application Entity (AE). The Mcc reference point may interface with another CSE within the same service provider domain, and the Mcc' reference point may interface with another CSE in a different service provider domain. The Mcn reference point may interface with the underlying network service entity (NSE). An NSE may provide underlying network services to the CSEs, such as device management, location services and device triggering. A CSE may contain multiple logical functions called "Common Service Functions (CSFs)", such as "Discovery", "Data Management & Repository". FIG. 5 illustrates CSFs supported by oneM2M.

The oneM2M architecture is a distributed architecture and supports deploying M2M/IoT services in a distributed manner across the following types of Nodes:

Application Service Node (ASN): An ASN is a Node that contains one CSE and contains at least one Application Entity (AE). In an example embodiment, an ASN may reside in an M2M Device;

Application Dedicated Node (ADN): An ADN is a Node that contains at least one AE and does not contain a CSE. In an example embodiment, an Application Dedicated Node may reside in a constrained M2M Device;

Middle Node (MN): A MN is a Node that contains one CSE and contains zero or more AEs. In an example embodiment, an MN may reside in an M2M Gateway;

Infrastructure Node (IN): An IN is a Node that contains one CSE and contains zero or more AEs. A CSE in an IN may contain CSE functions not applicable to other node types. In an example embodiment, an IN may reside in an M2M Service Infrastructure; and Non-oneM2M Node (NoDN): A non-oneM2M Node is a Node that does not contain oneM2M Entities (neither AEs nor CSEs). Such Nodes represent devices attached to the oneM2M system for interworking purposes, including management.

Figure 6:
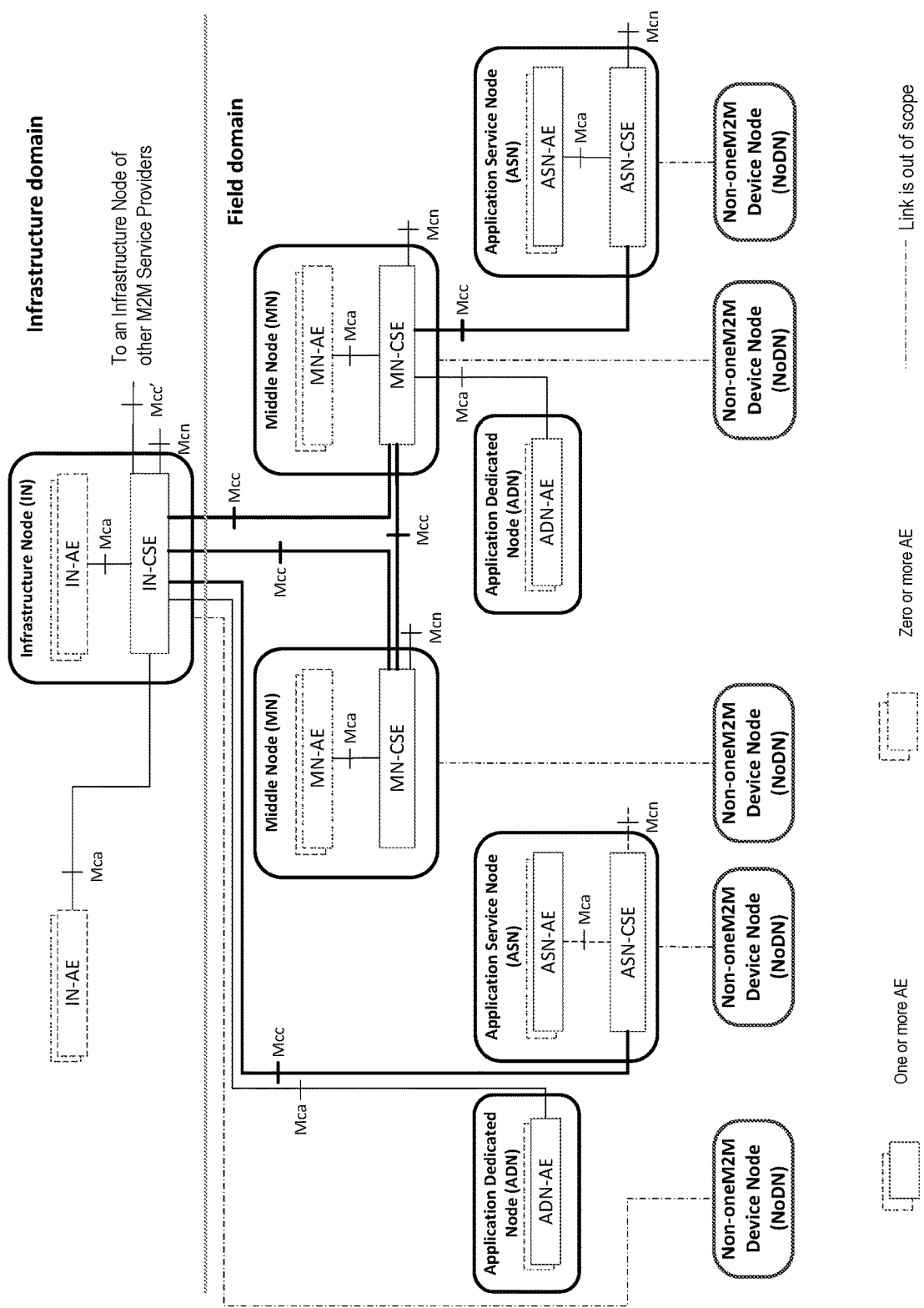
FIG. 6 illustrates example configurations supported by oneM2M.

Possible configurations of inter-connecting the various entities supported within a oneM2M system are illustrated in FIG. 6.

The existing oneM2M architecture defines an M2M Enrollment Function (MEF). This function supports provisioning of individual oneM2M devices (i.e., nodes) and applications (i.e., AEs) with identifiers and credentials. Once enrolled, applications (i.e., AEs) may then securely and individually register to a service layer entity (e.g., CSE). The oneM2M architecture also defines an M2M Service Subscription. A M2M Service Subscription defines which applications and devices are allowed to register to a CSE. However, oneM2M does not define the process for how a M2M Service Subscription is established. This process is assumed to take place in an out-of-band manner.

In an example oneM2M ecosystem, IoT devices manufactured by various companies are made available in an open and flexible ecosystem. In this ecosystem, consumers may obtain devices from various manufactures, install these devices (e.g., into their home networks) and have these devices co-exist with one another and function properly. In this ecosystem, IoT service providers may play the role of offering services to consumers to help them manage and interact with their diverse sets of IoT devices. For example, services may be offered to help consumers update the versions of software running on their devices to keep the software up to date and current, monitor and ensure that the security of their devices is intact by detecting threats and/or taking corrective action to thwart attacks, manage the data generated and collected by their IoT devices and manage and groom this data to provide additional information to the consumer.

Existing IoT ecosystems mainly comprise deployments of IoT devices and services that are not extensible or flexible in nature. For example, when a homeowner purchases a home automation package from a service provider, he must use the IoT devices and services only offered by that service provider (i.e., the system is a closed system). He does not have the flexibility to purchase and add additional devices from other IoT vendors of his choice, nor does he have the option to add additional services offered by other service providers that complement the services offered by his existing provider.

One of the technical roadblocks to enabling a more extensible and dynamic IoT ecosystem in which consumers have the freedom to deploy different combinations of IoT devices and use different services is the non-standardized, manual and non-extensible enrollment process used by many IoT service providers and their IoT service platforms.

Typically, before a service provider's platform and its IoT services may be accessed, an enrollee must first successfully complete a manual enrollment process. Such a process may typically involve a service enrollee enrolling himself and his IoT devices, applications, data and authorized users to the IoT service provider. The complexity and burden of this enrollment process has fallen squarely on the shoulders of the enrollee (i.e., the customer) himself. Traditionally, this has been done using a manual and out-of-band process involving the enrollee initiating contact (in person, over the phone, via the Web, etc.) with the provider to complete this process. Typically, such a process may require the enrollee to first know many details about his devices, applications, data and/or authorized users. For example, such details may comprise manufacturer, model number, serial number, software version, network or physical location, security credentials or passwords, functional settings, etc. After an enrollee has collected all of this information, he then must manually enter this information into a form (hand-written or electronic) or convey the information to a customer service representative. In many cases, an enrollee (or one or more of the enrollee's devices, apps or services) must also manually program the service provider's platform to configure it with additional information such as authorization privileges for each of his devices, applications, data sets and specified users. All of these steps may make the enrollment process for an enrollee complex and overwhelming.

Additionally, with the increased size and complexity of recent IoT network deployments, the enrollment/re-enrollment/dis-enrollment burden is becoming even greater for enrollees to bear. More and more IoT networks are being deployed with large numbers of IoT devices. Many of devices are being deployed in remote and/or unreachable locations with little or no human interaction with the devices. These networks also incur dynamic changes such as new devices that need to be added, new users that need to be allowed to access the devices and changes in ownership of the devices. All of these factors contribute to an even more complex task of enrolling service enrollees and their IoT devices, applications, data and users to a service provider's IoT platform.

Systems and methods are described herein to enable IoT service capabilities that may help automate and simplify the service enrollment process for IoT service enrollees. These capabilities enable a service enrollee to virtualize itself and its IoT devices, applications, data and users into a software profile that is representative of the service enrollee. Once virtualized, a service subscriber may then delegate the complexities and burden of service enrollment to an automated IoT service enrollment software function on its behalf. Likewise, these IoT service capabilities may also help automate the service enrollment process for IoT service providers. These capabilities enable a service provider to virtualize itself and its enrollment process into an automated software enabled process.

Described herein is an architecture for an IoT system that enables at least the following set of IoT service capabilities for automating the enrollment of IoT service enrollees to IoT service providers.

An IoT service capability and method is introduced to enable potential service enrollees to virtualize themselves and their IoT devices, applications, data and users into software entities that may then be enrolled with an IoT service provider's platform.

An IoT service capability and method is introduced to enable IoT service providers to publish discoverable IoT service enrollment information via its distributed IoT services platform. This capability may also enable potential service enrollees to query and discover available service enrollment options that are published by a service provider via its IoT service platform.

An IoT service capability and method is introduced to enable a service enrollee to establish a secure association with a service provider's platform and, via this secure association, securely enroll/re-enroll/dis-enroll with the service provider.

An IoT service capability and method is introduced to enable a virtualized IoT service enrollee to securely and dynamically enroll itself as well as its IoT devices, apps, data and authorized users to an IoT service provider's platform. Such a method may enable an IoT service platform to provide an enrollee with a set of automated enrollment services, such as auto creation of authorization policies for an enrollee, auto registration of an enrollee's IoT devices and applications and auto importing of an enrollees data.

The above IoT service enrollment capabilities may be implemented as advanced features of an IoT service enrollment function. Such a function and its capabilities may be a supported feature of an IoT service provider's IoT platform and may be used to automate the process for service enrollees to enroll themselves, their devices, their data and their authorized users to the platform.

Also described herein is a oneM2M embodiment describing how such advanced IoT service enrollment capabilities may be incorporated into the existing oneM2M architecture and used by oneM2M entities such as AEs, CSEs, MEFs and MAFs.

Because oneM2M does not define the process for how a M2M Service Subscription is established, the oneM2M architecture does not support the concept of a service subscriber having ownership or administrative rights to one or more IoT devices, applications, data sets and/or authorized users and enrolling itself as well as these entities to a service provider.

Additionally, for an ecosystem to exist where service providers may provide their services to consumers and their IoT devices in an open manner, more automated methods to discover service providers offering compatible services are needed. Further, more automated and dynamic methods to enroll consumers and their IoT devices to these service providers are also needed. Providing these more automated methods may allow consumers to freely purchase IoT devices that suit their functional needs and, in turn, find and enroll these devices to service providers offering compatible services for these devices.

The capabilities and example embodiments described herein may provide solutions to the above-described problems, among others. Specifically, the use of these capabilities by IoT service enrollees and service providers may enable a more extensible IoT ecosystem. Within this ecosystem, consumers may have the freedom to purchase and add various types of devices of their choosing to their networks and the flexibility to discover and use services offered from various service providers.

The Automated Service Enrollment (ASE) capabilities may be implemented as two logical functions. The first function may be an Automated Service Enrollment Client (ASE-C) function. The second may be an Automated Service Enrollment Server (ASE-S) function.

Figure 8:
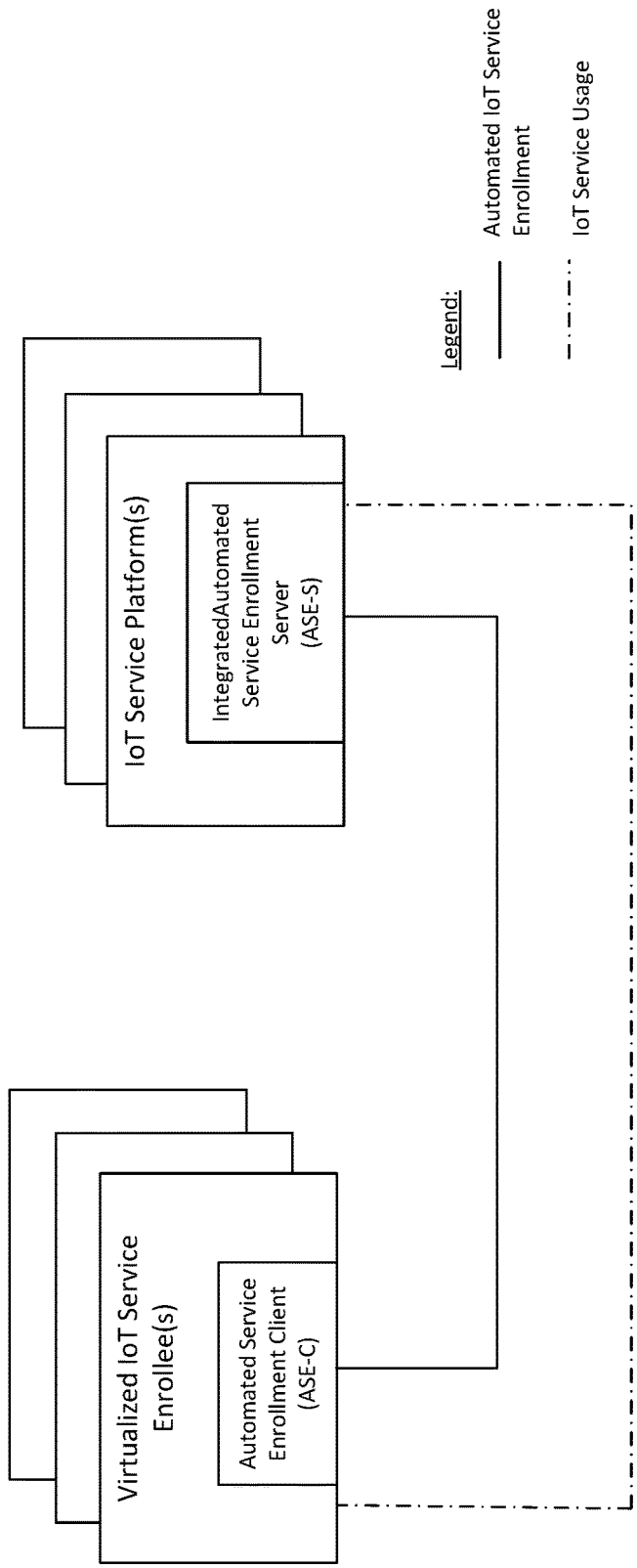
FIG. 8 illustrates an example deployment of automated IoT service enrollment architecture.
Figure 9:
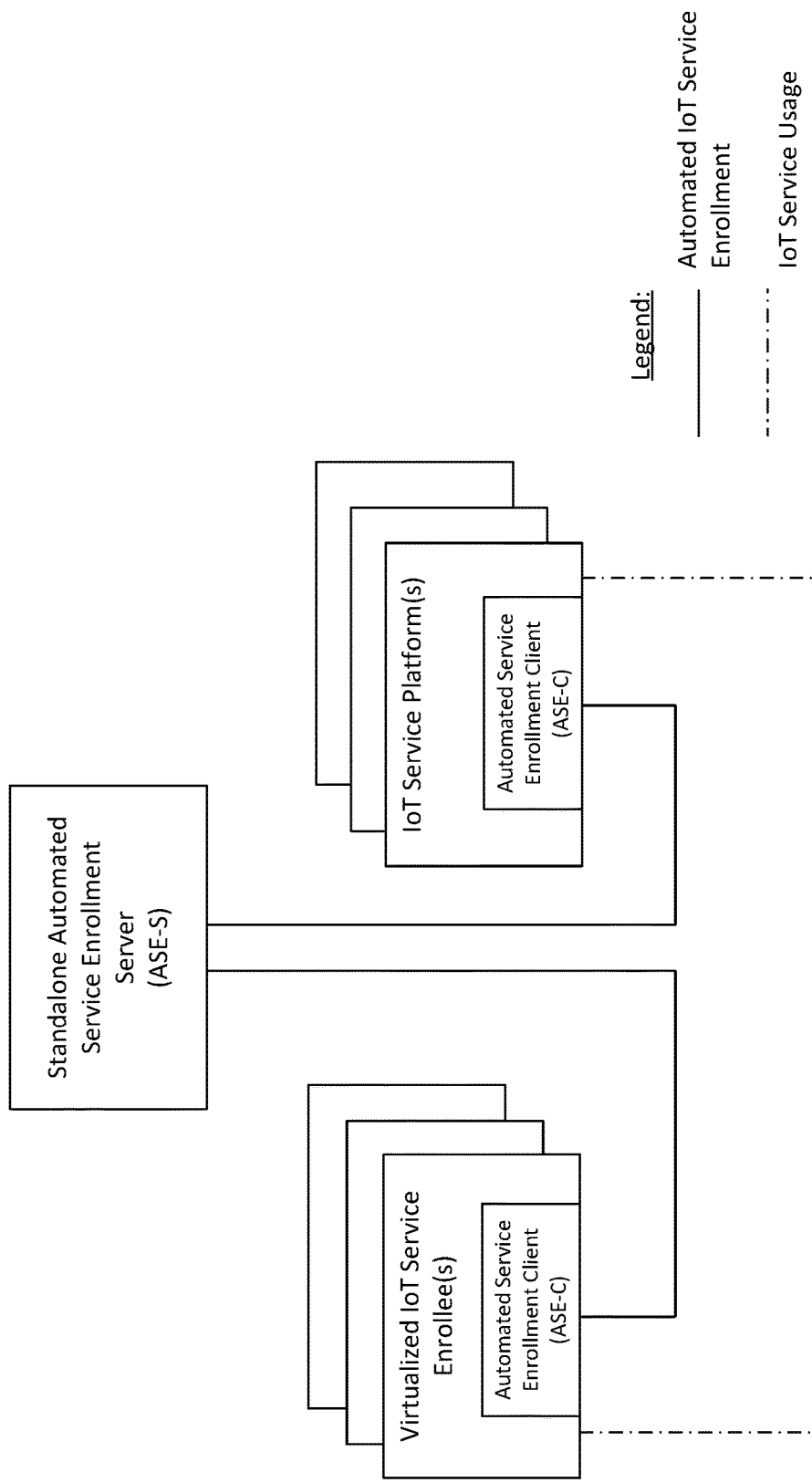
FIG. 9 illustrates another example deployment of automated IoT service enrollment architecture.

There are multiple deployment options for ASE-C and ASE-S. For example, as shown in FIG. 8, an ASE-C may be integrated as a function into a virtualized IoT service enrollee, and an ASE-S may be integrated as function within an IoT service platform. Alternatively, as shown in FIG. 9, an ASE-S may be deployed as its own standalone service. In such a case, an ASE-C may also be integrated into an IoT service platform. The ASE-Cs in the virtualized IoT service enrollee and IoT service platform may be used to communicate to the standalone ASE-S.

The division of functionality of an ASE into a client (ASE-C) and server (ASE-S) is just one example embodiment describing how to divide the ASE logic between components. Other configurations are also possible.

Figure 10:
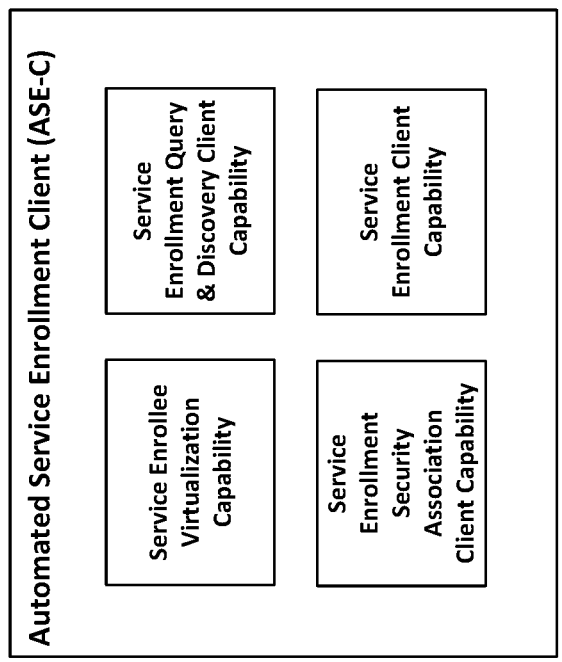
FIG. 10 illustrates an example automated IoT service enrollment client.

FIG. 10 illustrates an example embodiment of an Automated Service Enrollment Client (ASE-C) function as described herein. Such a function may support a set of newly introduced capabilities to assist with the virtualization of a service enrollee. Such capabilities may comprise the following: a Service Enrollee Virtualization Capability; a Service Enrollment Query and Discovery Client Capability; a Service Enrollment Security Association Client Capability; and a Service Enrollment Client Capability.

After the service enrollee is virtualized, the ASE-C function may support capabilities to automate the discovery of service providers, establish a secure association with a service provider and the secure enrollment of the virtualized IoT service enrollee to IoT service platform(s) operated by IoT service provider(s).

Figure 11:
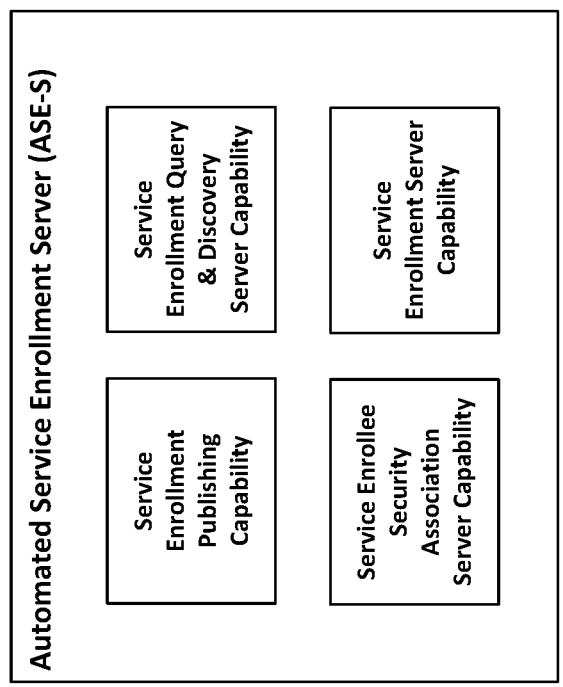
FIG. 11 illustrates an example automated IoT service enrollment server.

FIG. 11 illustrates an example embodiment of an Automated Service Enrollment Server (ASE-S) function as described herein. Such a function may support a set of newly-introduced capabilities to automate the publishing of supported service provider enrollment options such as types of services, max amount of data storage, types of supported data, max number of devices, types of supported devices, max number of applications, types of applications, max number of authorized users and the max number of allowed notifications for a given time period. The ASE-S may also support servicing of service provider discovery requests from service enrollees and establishing a secure association with service enrollees and enrollment of IoT service enrollees to the IoT service platforms that are operated by IoT service providers. Such capabilities may comprise the following: a Service Enrollment Publishing Capability; a Service Enrollment Query and Discovery Server Capability; a Service Enrollment Security Association Server Capability; and a Service Enrollment Server Capability. Together the ASE-S and ASE-C may provide an automated and secure method for IoT service enrollees to enroll to IoT service provider platforms.

Figure 7:
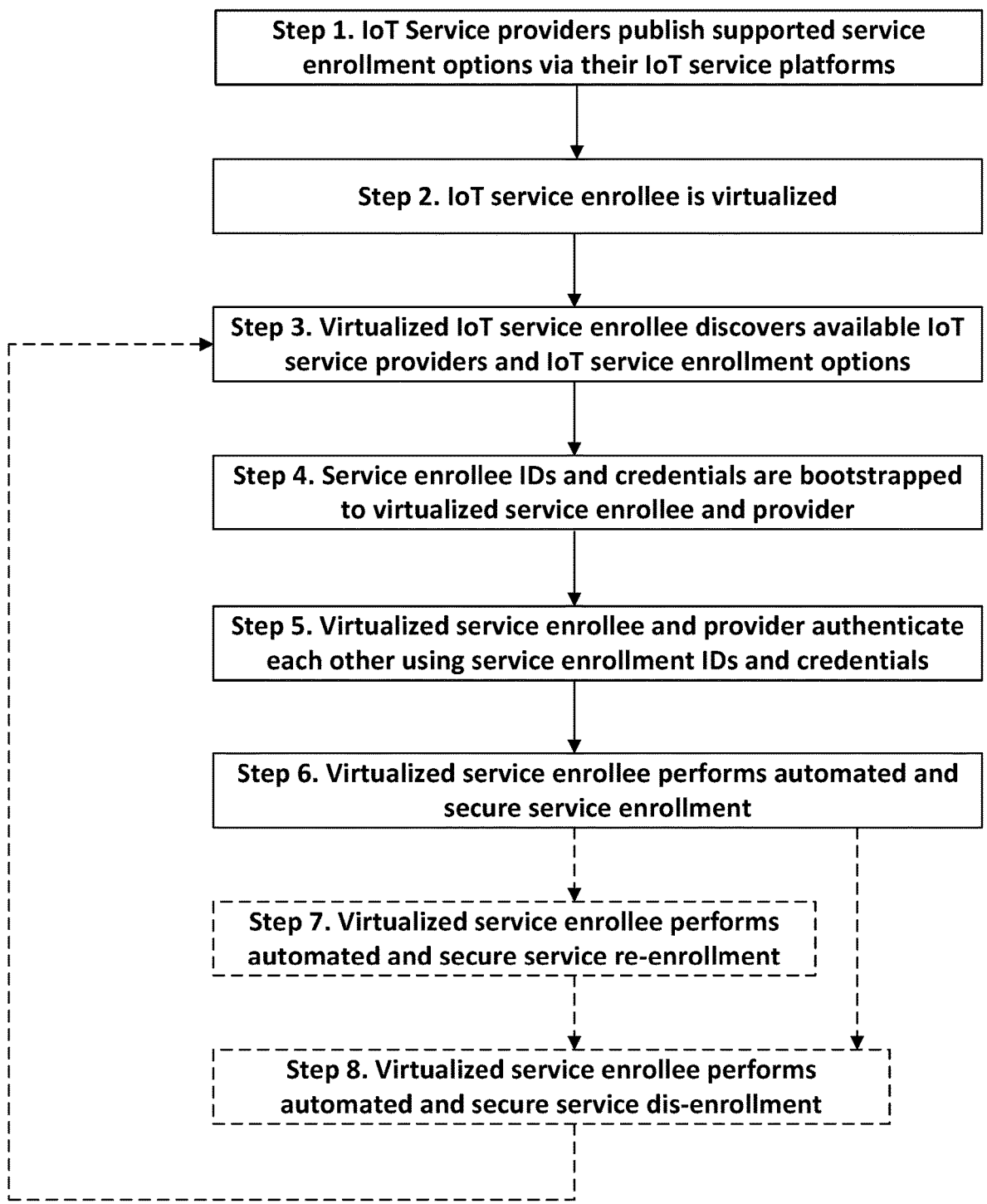
FIG. 7 is a flow diagram depicting an example process for automating IoT service enrollment.

A method is introduced to automate the enrollment of IoT service enrollees and their IoT devices, applications, data and authorized users to an IoT service provider's platform. FIG. 7 is a flow diagram depicting such a process that is enabled by a set of new service enrollment capabilities.

At step 1, using a new service enrollment publishing capability of an ASE-S, an IoT service provider's platform may publish a list of the provider's supported service enrollment options, such as types of services, max amount of data storage, types of supported data, max number of devices, types of supported devices, max number of applications, types of applications, max number of authorized users and the max number of allowed notifications for a given time period.

At step 2, using a new service enrollee virtualization capability of an ASE-C, a human IoT service enrollee may be virtualized into a software representation of himself, and likewise his IoT devices, applications, data sets and authorized users may also be virtualized into software representations of themselves. Additional details regarding this virtualization are described below.

At step 3, using a new service enrollment query and discovery capability of an ASE-C, a virtualized IoT service enrollee (i.e., an ASE-C acting on behalf of a service enrollee) may perform a query to discover available IoT service providers offering service enrollment options that meet its requirements. Such a query may be directed towards an ASE-S. An ASE-S may be a deployed by an IoT service provider as a function in its platform or by other entities such as an IoT device manufacturer's web site, etc. The discovery results may include a list of proposed IoT service providers, service enrollment options, service provider security association capabilities, and bootstrapping server addresses or identities. Based on the discovery results, a virtualized service enrollee may then select a service provider that meets its requirements.

At step 4, using a new service provider security association capability of an ASE-C and ASE-S, a virtualized IoT service enrollee (i.e., an ASE-C acting on behalf of a service enrollee) may perform a bootstrap operation with an IoT service provider. The bootstrap may result in the provisioning of service enrollment credentials and identifiers to the virtualized service enrollee and the chosen service provider's platform.

At step 5, using the credentials that were obtained in step 4, a virtualized IoT service enrollee (i.e., an ASE-C acting on behalf of a service enrollee) may perform an authentication of the IoT service provider's ASE-S and vice versa and establish a security association between themselves.

At step 6, using the secure association established in step 5, a virtualized IoT service enrollee (i.e., an ASE-C acting on behalf of a service enrollee) may enroll itself to one or more IoT service provider's ASE-S.

At step 7, using a new service enrollee enrollment capability, a virtualized IoT service enrollee (i.e., an ASE-C acting on behalf of a service enrollee) may re-enroll itself (if and when it is needed) to one or more IoT service providers. For example, such a process may be performed when modifications are necessary (e.g., adding new IoT devices, applications, data sets or users). Similarly, an IoT Service Provider may initiate re-enrollment (if and when it is needed). For example, this may be needed if one or more of the enrollee's devices, applications, data sets or authorized users fails to comply with the policies and rules defined by the service provider.

At step 8, using a new service enrollment capability, a virtualized IoT service enrollee (i.e., an ASE-C acting on behalf of a service enrollee) may dis-enroll itself (if and when it is needed) from one or more IoT service providers. For example, such a process may be performed when a service enrollee decides to terminate its relationship with a IoT service provider (e.g., when changing providers). Similarly, an IoT Service Provider may initiate dis-enrollment (if and when it is needed). For example, such a process may be needed if the enrollee (i.e., the device owner) fails to comply with the service provider's rules or policies.

Introduced herein is a capability to virtualize an IoT service enrollee into a software profile that is representative of the enrollee and his IoT devices, applications, data sets and authorized users. Such a software profile may effectively capture service enrollment information and preferences of the enrollee as well as information regarding his IoT devices, applications, data sets and authorized users and the relationships that exist between them (i.e., as captured in FIG. 1). A capability to virtualize an IoT service enrollee may facilitate the automated enrollment of the service enrollee to an IoT service provider's IoT platform. By virtualizing a service enrollee into a software profile of the service enrollee, the manual and human interactive actions typically performed between a service enrollee and a service provider may be automated and performed in software on behalf of the service enrollee and provider.

To enable service enrollee virtualization, described herein is a new capability to enable automation of a process of virtualization of a service enrollee and his associated IoT devices, applications, data and users. Such a capability may be distributed in nature and may comprise a component hosted by the new ASE-C function and a component hosted by the new ASE-S server function. Such a capability may support a user interface that enables a service enrollee to more easily virtualize itself and its IoT devices, applications, data and users. This user interface itself may support features to help automate the process of virtualization of the service enrollee. A feature of the interface may be the use of photos for the automation of IoT service enrollee virtualization. In an example embodiment, photos of the service enrollee as well as photos of its identification such as a driver license, a credit card or a utility bill may be used to collect service enrollment information for the enrollee. In another example embodiment, a service enrollee's photos of family members and/or friends or photos of their identification may also be used to collect enrollment information regarding a service enrollee's list of authorized users. In yet another example embodiment, photos of a service enrollee's IoT devices may be used to collect enrollment information regarding its IoT devices as well as the types of applications hosted on these devices or the data produced or consumed by these devices. For example, a photo of a sticker, or label, on an IoT device may be used to capture identifying information about the device such as serial number, IMEI, IMSI, MAC ID, QR Code, URL, bar code, etc. Additionally, other identifying information may be visible on the device and may only be visible inside of the device housing or may be provisioned in the device memory and provided to the customer at the time of purchase.

Such a user interface may support a mechanism to allow a service enrollee to take and/or upload photos. Such a mechanism may be enabled by co-hosting this capability together with a camera (e.g., as an app on smart phone that also hosts a camera). After a photo of an IoT device is taken or uploaded, this capability may extract information pertinent to IoT service enrollment from the photo.

In an example embodiment, information such as a device's make, model and serial number may be extracted from a photo. In another example embodiment, information such as the types of applications and data either hosted on these devices or produced or consumed by these devices may be inferred once the make and model of a device is known. Additional information such as the types of services or even the compatible service vendors may also be determined. Such information may be extracted from information printed on the packaging of the IoT device (e.g., barcode, QR code, URL, manufacturer number and serial number, etc.). Alternatively, this capability may support either a local database or communication with a remotely hosted database(s) of popular IoT device images (e.g., querying IoT registries or various manufacturer-hosted databases). This capability may support comparing the image of the IoT device in a photo and possibly additional information it is able to extract from the photo against images and information of popular IoT devices stored in these databases to search and find a match. If a match is found, then the information such as the make and model of the IoT device, the type of software hosted by device and the type of data produced or consumed by the device may be determined. This functionality may be further extended to also support the ability to detect and enroll more complex devices hosting multiple IoT sub-component level devices (e.g., multiple sensors or actuators). For example, a piece of complex factory machinery may host several IoT sensors and actuators, each having different functionality, produced by different manufacturers or having different models or versions. Such a capability may support the identification of the complex device by scanning database(s) containing photos and information of popular IoT devices to try to find a match. If one is found, the information regarding the supported set of IoT component level devices hosted by this more complex device may be found in an automated manner. When enrolling to a service provider's platform, information regarding the complex device may be provided as well as information regarding each of its sub-component level IoT devices may also be provided.

In another example embodiment, additional context information such as device's deployment surroundings may also be extracted by this capability. For example, in addition to photos of IoT devices themselves, photos of their deployment surroundings may also be taken and used to help automate IoT service enrollment. In one embodiment, pictures of an IoT device's physical surroundings may be used by this capability to collect additional context such as the location the device is deployed in (e.g., deployed in a kitchen or bathroom), the types of information that the IoT device is capable of collecting (e.g., temperature in the upstairs or downstairs of a house) and the types of actions the device may perform (e.g., whether a switch turns lights on/off or opens/closes a garage door). Leveraging this extracted information, this capability may process an IoT device's surroundings and make inferences about its location or its function. For example, this capability may infer that an IoT device is a kitchen light switch if it extracts from a photo that the light switch is near a stove versus a bathroom light switch if it detects a light switch is near a toilet. Such extracted information may be used to create a name, or identifier for the device. For example, the extracted information may be used to name a device "kitchen outlet" or "front door lock". A GUI may provide the enrollee the option of changing the suggested name, location or function before (or after) enrollment. Hence, this information may function as an automated suggestion, which the enrollee may then be asked to confirm.

The service enrollee virtualization capability may support the ability to compare photos of IoT devices with additional service enrollee photos to detect matches in context information between the photos (e.g., a matching portrait on a wall or lamp on table). In doing so, this capability may use information assembled from multiple photos, all of which may not contain the IoT device itself or may not have been taken at the same time, in order to make inferences on the type and function of an IoT device in its surroundings as well as it deployment location. This may enable a richer and more extensive pool of context information that the capability may then extract IoT service enrollment information from. In an example embodiment, such a capability may support scanning service enrollee photo's in a local database (e.g., co-hosted together on a smart phone). In another example embodiment, the capability may scan photos hosted in a service enrollee's cloud account. In yet another example embodiment, this capability may scan photos from one or more of the service enrollee's social media accounts or the accounts of family members, friends or other service enrollees that happen to be nearby and have available social media accounts that are open and available to this capability.

The service enrollee virtualization capability may also supplement the information extracted from a photo with additional service enrollee related metadata to help automate service enrollment. In an example embodiment, location information of a service enrollee's IoT devices may be supplemented. For example, location information may be obtained from a GPS capability hosted together with the service enrollee virtualization capability and the camera used to take photos in close proximity to the service enrollee's IoT devices. In another example embodiment, the service enrollee virtualization capability may allow the service enrollee to define a relative location of the device. This may be done by entering a description, such as "front door lock" or "back door lock," or attaching a photo, such as a thumbnail, which may be used to describe the IoT device.

Another method introduced herein is to automate the virtualization of the enrollee, its IoT devices, applications, data and users to support a GUI that may allow an enrollee to create a drawing of his IoT network. Such a drawing may include details such as the layout of rooms in his house, the locations of devices in these rooms, device information, application information, data information, and user information. The GUI may support assisting the enrollee by providing drawing tools, widgets, icons and menus to automate the drawing process. The GUI may also support uploading drawings created externally (e.g., by other drawing tools).

In another example embodiment, rather than a camera and photo being used to virtualize an IoT service enrollee and its devices, NFC technology may be used. Such a method may be enabled by co-hosting NFC capability together with an NFC enabled user device (e.g., as an ASE-C on smart phone that also supports NFC functionality). An enrollee may swipe the NFC enabled user device near the IoT devices and relevant information may be transferred to the ASE-C (e.g., make, model, etc.). Additionally or alternatively, the NFC information may tell the enrolling tool where to find the IoT device information (e.g., manufacturer's website or database). For the enrollee information, the ASE-C may query cellular network(s) to get enrollee information as well as other context such as the enrollee's current location.

After a service enrollee is virtualized by collecting his service enrollment related information via this new capability, this information may then be passed on to the other new capabilities supported by the ASE-C and ASE-S functions. In doing so, the enrollment of the service enrollee with a service provider may be automated and may no longer require manual intervention from the service enrollee or the provider.

Using such a service enrollee virtualization capability, a service enrollee may also create service enrollment policies or rules that may be used to guide the ASE-C and ASE-S functions in making service enrollment choices on behalf of the service enrollee and/or service provider. Such policies may be configured by a service enrollee during the virtualization process and/or via this capability's user interface. The interface may support service enrollment policy configuration features. In an example embodiment, this capability may support a pre-configured set of service enrollment policy choices that a service enrollee may select from (i.e., a menu). For example, service enrollment policy choices may comprise types of services, max amount of data storage, types of supported data, max number of devices, types of supported devices, max number of applications, types of applications, max number of authorized users and the max number of allowed notifications for a given time period.

A new service enrollment publishing, query, and discovery capability may be used to discover available IoT service providers and service enrollment options supported by these providers and their IoT service platforms. Such a capability may be distributed in nature and comprise a component hosted by the new ASE-C function and a component hosted by the new ASE-S function.

The service enrollment publishing, query, and discovery capability may enable IoT service providers to publish discoverable IoT service enrollment information regarding the services the provider offers and the available options to the enrollee. This capability may support a service enrollment publishing API, which may enable a service provider as well as third party application/service providers to programmatically publish service enrollment related information to its IoT service platform. The types of service enrollment information published to an IoT service platform by a provider may include, but is not limited to, one or more of the following:

Types and identities of IoT services supported by the IoT service platform;

Information regarding automated enrollment options and procedures supported by the IoT service platform and provider, which may include the following:
  Whether automated service enrollment for one or more services is supported; and
  Automated enrollment instructions for how to enroll for access to services;

Scheduled times when one or more supported IoT services are available and online for use (e.g., time of day, week or month);

Information on which of the offered services are open for public use;

Information on which of the offered services require a service enrollment plan to access;

Information on which of the offered services has an initial trial period where the service is open for public use before it requires a service enrollment plan to access;

The types of IoT devices, applications, and data their vendors and/or manufacturers supported or allowed to enroll by a service provider;

For services requiring a service enrollment, information regarding the conditions or terms of access, such as the following:
  If there are any schedule restrictions on accessing a service (e.g., one access per hour, access only during certain hours of the day, etc.);
  If there are any data usage restrictions on accessing a service (e.g., 100 bytes per request);
  If there are any location restrictions on accessing a service (e.g., only access the service within a certain network domain or geographical region);
  If there are any protocol or data model restrictions on accessing a service (e.g., access allowed only if certain protocols or data model is used);
  Privacy polices associated with the service; and
  How many individual users can share the service;

A service provider's security credential (public key certificate) may be published and included in the discovery response for clients to authenticate (as an option) the service provider. In addition, such a credential may be used by the service enrollee when establishing a secure association with the service provider.

This service enrollment publishing, query, and discovery capability may also enable virtualized IoT service enrollees to issue service enrollment queries to discover available service providers. For example, a virtualized IoT service enrollee (i.e., ASE-C) may issue queries to an ASE-S. For example, such an ASE-S may be deployed as a function in a service providers IoT platform or as a function of a device manufacture web site or database whose address may be provisioned to the virtualized IoT service enrollee. The queries may be used to discover service provider enrollment options and whether they meet the service enrollee's requirements. The capability may support a service enrollment discovery API, which may enable a service enrollee to programmatically discover service enrollment related information from available IoT service platforms and their providers. Such requests may be made in an automated and programmatic fashion by an ASE-C without the manual intervention of the enrollee (i.e., a human being). This automated and machine centric discovery mechanism may be a critical requirement for many IoT use cases and deployments. The types of service enrollment discovery criteria that a virtualized service enrollee may specify in a query may include, but are not limited to, one or more of the following:

Discover services offered by service providers that do not require a service enrollment to access;

Discover IoT services that provide usage of its service(s) by IoT devices, applications, or data from a specific vendor or manufacturer (i.e., list of the types of devices, applications, data, users that enrollee is looking to enroll);

Discover services offered by service providers that require service enrollments but meet one or more of the following service enrollment requirements of the enrollee:
  IoT services that provide access to service(s) during specified times;
  IoT services that provide a trial period where access to service(s) is open;
  IoT services that provide a minimum number of accesses within a specified time interval;
  IoT services that provide a minimum number of IoT devices, applications, users to be enrolled;
  IoT services that provide a minimum amount of data usage either per request, per given time interval, per IoT device, per IoT user, per IoT application, etc.;
  IoT services that provide usage of service(s) without location restrictions or use within specified location regions such as within certain network or geographical region(s);
  IoT services that provide usage of its service(s) by IoT devices, applications, or service that support specified serialization schemes, data models, schemas or ontologies;
  IoT services that provide usage of its service(s) by IoT devices, applications, or service that support specified transport protocols;
  IoT services that provide usage of its service(s) by IoT devices, applications, or services that support specified security mechanisms such as end-to-end security, content or object based security, specific security protocols, security algorithms, and security credential bootstrapping mechanisms;

IoT services that provide usage of its service(s) without having to grant other enrollee's access to its IoT devices or data;

IoT services that have certain privacy policies; and

IoT services that provide usage of its service(s) by IoT devices, applications, or data from a specific vendor or manufacturer.

In an example embodiment, the service enrollment publishing, query, and discovery capability's API may be RESTful in nature and comprise one or more resources that a service provider may CREATE or UPDATE with discoverable service enrollment information and, in turn, a service enrollee may RETRIEVE and discover service enrollment options and matching service enrollments.

A new service enrollee and provider security association capability may be used to establish a security association between a virtualized IoT service enrollee and an IoT service provider's platform. Such a capability may support functionality to securely bootstrap IoT service enrollment credentials and identifiers needed for a virtualized service enrollee to enroll for service with an IoT service provider's platform. This bootstrapping may comprise a client component and a server component. The client component may be supported by an ASE-C. The server component may be supported by ASE-S.

An ASE-S function may be used to bootstrap IoT service enrollment identifiers and credentials to an ASE-C function. Such bootstrapping may be initiated by an ASE-C function after querying for and discovering an IoT service provider's platform that meets its service enrollment requirements and which the ASE-C then determines to enroll to.

The service enrollee and provider security association capability may enable IoT service providers to configure a pool of available IoT service enrollment identifiers and credentials, which may then be bootstrapped to service enrollees wishing to enroll to a given IoT service provider's platform. The capability may support an API that may enable a service provider to programmatically publish pools of available service enrollment credentials and identifiers. If an IoT service provider hosts its own ASE-S function as a service of its IoT platform, then this service enrollment credential and identifier bootstrapping capability may be included as part of this function. However, if the service provider does not host its own AES-S function and instead relies on a third party function, then the service provider may first need to establish a secure association with that third party before using this API to configure a pool of available IoT service enrollment identifiers and credentials.

This service enrollee and provider security association capability may also enable virtualized IoT service enrollees to be bootstrapped with the necessary service enrollment identifiers and credentials needed to enroll for services offered by one or more IoT service provider platforms. Such bootstrapping may be triggered and initiated by a virtualized service enrollee. In an example embodiment, the ASE-C function introduced herein may initiate this bootstrapping automatically and on behalf of a service enrollee based on a trigger event such as the successful discovery of a service provider and a match of requirement criteria from both parties. An ASE-S function may support an API that may enable an ASE-C function to programmatically bootstrap itself with the necessary service enrollment credentials and identifiers needed to enroll for service with one or more IoT service provider's IoT platforms. Note, if the ASE-S is hosted by a third party, the security association may instead be established between the virtualized IoT service enrollee's ASE-C and the ASE-S hosted by this third party. The ASE-S in turn, may have a secure association between itself and service provider platform's ASE-C functions. The ASE-S may use this secure association to forward enrollment information back-and-forth between the virtualized IoT service enrollee's ASE-C and the service provider platform's ASE-C.

The service enrollee and provider security association capability may create a secure association between a virtualized IoT service enrollee and an IoT service provider's platform. An ASE-C function may use the successful bootstrap of an IoT service enrollment identifier and credential as a trigger to automatically establish a secure service enrollment association with the corresponding IoT service provider's platform. In doing so, the corresponding service enrollee and provider may form a secure and trusted relationship with one another that is based on the bootstrapped service enrollment credentials and identifiers.

In an example embodiment, the introduced security association may comprise a one-way or two-way authentication handshake between the ASE-C function and the IoT service provider's platform. Such a handshake may comprise security challenges based on a bootstrapped service enrollment credential and identifier. When the ASE-C function initiates the security association, the ASE-C may pass the service enrollment identifier and security credentials as part of the handshake. Upon receiving this service enrollment identifier, the IoT service platform may perform a look up to find the service enrollment identifier and corresponding service enrollment credential. If the platform supports its own ASE-S function, this look up may be a local request. However, if the IoT service platform does not support a local function, the IoT service platform may initiate a request to a remote ASE-S function. This request may include the service enrollment identifier. The response to this request may include a determination of whether the ASE-C has been authenticated by the ASE-S function and bootstrapped with the service enrollment identifier. The response may also include the corresponding service enrollment credential associated with the identifier and other service enrollment information related to the client.

After the IoT service platform receives the service enrollment credential from the ASE-S function, the IoT service platform may create a secured (e.g., encrypted and integrity protected) challenge request and return it to the ASE-C. When receiving the challenge, the ASE-C may decrypt the request and respond to the challenge with a response that may also include its own challenge request back to the IoT service platform, if desired. At the completion of such a challenge handshake, the service enrollment association between the ASE-C and the IoT service platform may be successfully established or may be denied by either the ASE-C or the IoT service provider's platform.

A new service enrollment capability may be used to enable a virtualized IoT service enrollee to enroll to an IoT service provider's platform in an automated manner. After an ASE-C function successfully creates a service enrollment security association with an IoT service platform, the ASE-C may automatically trigger enrolling of the virtualized service enrollee the ASE-C is acting on behalf of Such a service enrollment capability may comprise service enrollment functionality that may be supported by an ASE-C and ASE-S.

The ASE-C service enrollment functionality may enable automated enrollment of virtualized service enrollees and their virtualized IoT devices, applications, data and users. The ASE-C may issue requests to the ASE-S to perform this enrollment. The ASE-S may support a service enrollment network API that may enable an ASE-C to programmatically issue service enrollment requests that then may be encapsulated and exchanged between an ASE-C and ASE-S using various underlying networking protocols. Within these requests, the ASE-C may include various service enrollment centric information about a virtualized service enrollee and his IoT devices, applications, data and users. The ASE-S may process these enrollment requests by inspecting the enrollment information within the request and making a determination regarding whether enrollment will be permitted. If permitted, the ASE-S may also determine proper enrollee specific settings per the information provided in the enrollment request. These enrollee specific settings may also be customized at the granularity of each individual type of service provided to an enrollee based on the enrollee's specified requirements.

The types of service enrollment centric information that may be included in an enrollment request issued by an ASE-C to an ASE-S may include, but are not limited to, one or more of the following:

A service enrollment identifier to associate the request with a given service enrollee and service enrollment. Such an identifier may be obtained from an ASE-S when an ASE-C bootstraps with an ASE-S;

Information about the service enrollee requesting to enroll (e.g., proof of identity). Such information may be obtained from an ASE-S when an ASE-C bootstraps with an ASE-S. Alternatively, it may be pre-provisioned to an enrollee;

Information regarding each IoT device that the service enrollee is requesting to enroll. The type of information for an IoT device may include but is not limited to:
  Device identifier, manufacturer, make, model, serial number, network address, firmware/OS version, application SW hosted on device, etc.; and
  Policies for the devices that specify who, when, where and how the devices may be accessed;

Information regarding each IoT application that the service enrollee is requesting to enroll. The type of information for an IoT application may include but is not limited to:
  List of device instances or device types an application is hosted on. Such a list may include device identifiers such as IMEI, MAC ID, external ID, IP Address, or IMSI;
  The data or information model, semantic ontology model, content serialization format or transport protocols supported by the application;
  The rate at which the application generates requests for service (e.g., sensor reporting rate) and the data size/bandwidth requirements per request;
  The max rate at which the application may accept requests from the platform (e.g., notification rate);
  The sleep schedule of the application; and
  Policies for the applications that specify who, when, where and how the applications may be accessed;

Information regarding each IoT data set that the service enrollee is requesting to enroll with a service provider's platform. Where the type of information for an IoT data set may include but is not limited to:
  The type of data set (e.g., parking garage data, etc.);
  The information model, semantic ontology model, content serialization format of the data set;
  The size of the data set such as total size and/or average size per individual data instance in the set;
  Policies specifying who is allowed to access the data set and what operations they are allowed to perform on it, when they are allowed access the data and from which locations, at what time and for how long, or with what devices or device types;
  A network address(es) of where the data set is currently hosted;
  An indication of whether or not the enrollee would like to have the service platform import the data set or instead link to the data set hosted elsewhere. Included in this indication may be instructions of how the data is to be imported. This may include in which types of resources, the hierarchy of resources or the schema definition of each resource that the data is to be imported into; and
  Privacy polices associated with the data set (i.e., whether the data may be exposed to third parties);

A list of selected service enrollment electives and their desired settings, e.g., desired data storage capacity, desired number of notifications per month, etc.;

An acknowledgement and agreement to access the services offered by the IoT service platform in a manner that may comply with service enrollment;

A proposed service enrollment lifetime;

A list of specified authorized users that may be allowed access to a service enrollee's IoT devices, applications and/or data sets and their respective privileges,
  Wherein a list of users may be expressed as a list of IoT service enrollee IDs or IoT service enrollment IDs, and wherein a service enrollee ID is a unique ID of the enrollee and a service enrollment ID is an ID to identify an enrollment relationship between an enrollee and service provider. In some example embodiments, such IDs may be equivalent to one another. However, in other example embodiments, it may be possible for an enrollee to have multiple active service enrollments with a single provider; and
  Access control privileges for users that specify access control rules restricting what, when and where the users may perform operations on what IoT devices, applications or data;

A desired or required service schedule of when the service enrollee may request to access certain services; and Contact information (email, text, etc.) for a service enrollee such that ASE-S may send status updates and notifications to an ASE-C, which may then be turned into alerts to the service enrollee.

In another example embodiment, a service enrollee may not be required or limited to specifying all of its enrollment information regarding all of the IoT devices, applications, data sets and users all at once in an upfront manner at the time of service enrollee enrollment. Rather, additional enrollment information for IoT devices, applications data sets and users may be specified later such as when an individual enrollee's device, application, data set or user is enrolled. For example, when a user is enrolled, its devices, applications and data may be enrolled, and when a device is enrolled, its application and data may be enrolled. This provides extensibility as well as scalability to the enrollment process.

The types of service enrollment centric information that may be included in an enrollment response returned back to the ASE-C from the ASE-S may include, but are not limited to, one or more of the following:

An overall enrollment status indicating whether the service enrollment completed successfully or not. If the enrollment was not successful then a corresponding reason;

A list of successfully and/or unsuccessfully enrolled IoT devices, applications, data sets or authorized users. If the enrollment of a particular device, application, data set or authorized user was not successful, then a corresponding reason why;

An indication of accepted service enrollee relationships between its IoT devices, applications, data sets and users. For example, service provider may not support a particular application or data format for a given device;

A service enrollment lifetime. If re-enrollment is not performed before this time expires, then the service enrollment may be suspended;

Information regarding service provider function(s) that enrollee may use to interact with the service platform, e.g., enrollment/bootstrap server PoC, authorization server PoC, DM server PoC;

A list of protocol related requirements that service enrollee and its IoT entities may use to communicate with the IoT service platform; and Service schedule information (e.g., when service enrollee is permitted to use certain services).

Example oneM2M embodiments of the introduced Automated Service Enrollment (ASE) functionality are described hereafter. The new ASE capabilities may be used to enable the virtualization of a oneM2M service subscriber (i.e., enrollee), the discovery of one or more available oneM2M service providers by a oneM2M service subscriber, and the enrollment of a oneM2M service subscriber to one or more oneM2M service providers.

Figure 12:
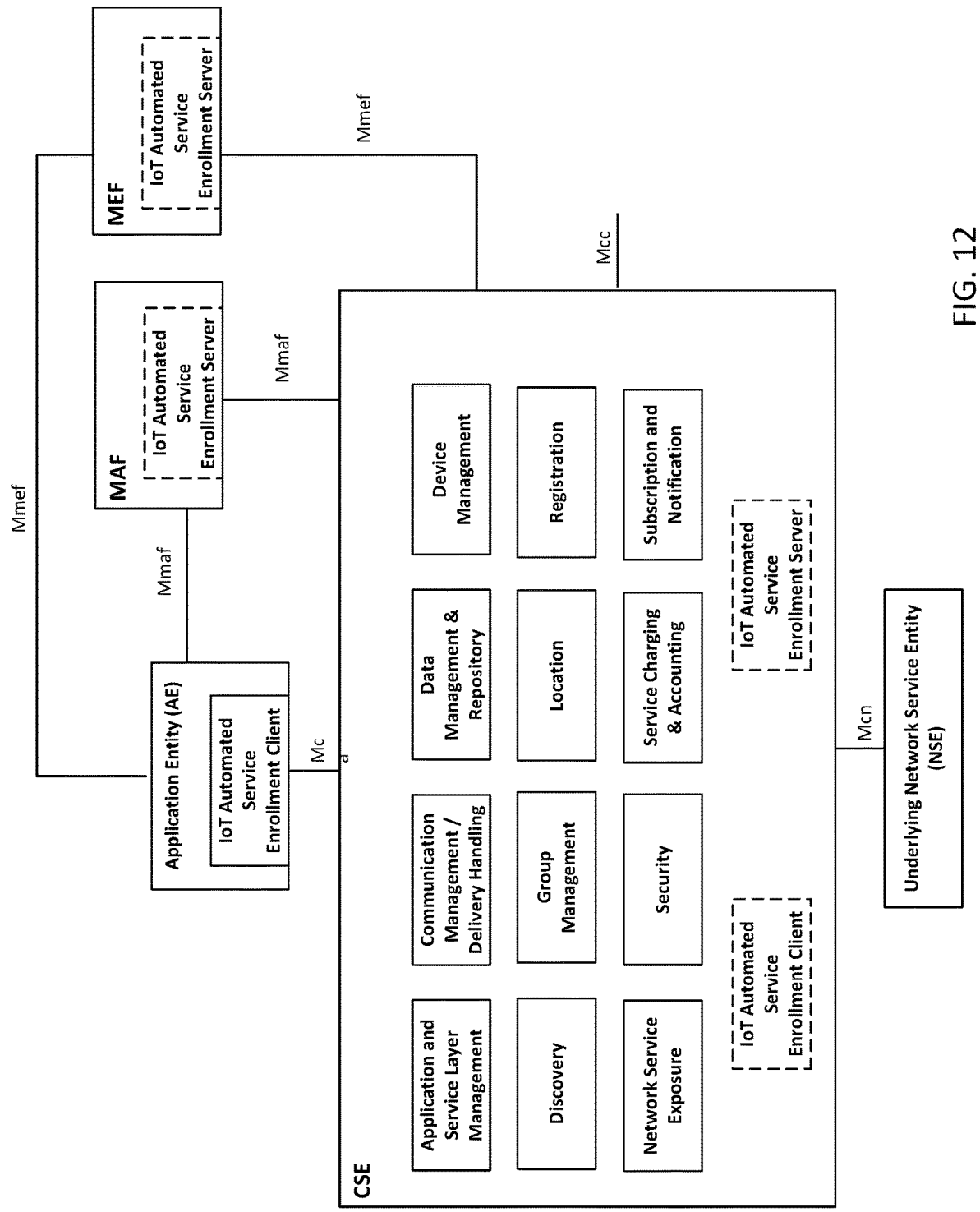
FIG. 12 illustrates an example embodiment of a oneM2M service subscriber enrollment architecture.

Within the oneM2M architecture, the ASE-S capabilities described herein may be implemented as a new Common Service Function (CSF) of a Common Services Entity (CSE), as illustrated in FIG. 12. Such a new CSF may be used to enable ASE-S support in a oneM2M system. Alternatively, the ASE-S may also be implemented as a capability of an existing oneM2M CSF (e.g., Security CSF) or as a capability of the oneM2M defined M2M Enrollment Function (MEF) or M2M Authentication Function (MAF).

ASE-C functionality may be supported by a oneM2M Application Entity (AE) and a oneM2M CSE. In an example embodiment, an AE may initiate automated enrollment requests via an ASE-C and send such requests to a ASE-S hosted by a MEF, MAF or a CSE.

Currently, oneM2M defines an enrollee as a generic application (i.e., oneM2M AE) or generic device (i.e., oneM2M node). Enhancements are described herein to the oneM2M enrollment procedure to enable an enrollee to be a oneM2M service subscriber having ownership and/or administrative rights over one or more IoT devices, IoT applications, IoT data sets and/or authorized users. In an example embodiment, the ASE's Service Enrollee Virtualization Capability, as described herein, may be used to virtualize a oneM2M service subscriber into a specialized type of oneM2M AE having knowledge of the service subscriber's identity and its IoT devices, applications, data sets, authorized users and service enrollment preferences and policies.

Additionally, a virtualized service provider may be a oneM2M enrollment function (MEF), oneM2M authentication function (MAF) or oneM2M CSE having knowledge of the service provider's identity, information regarding the service provider's enrollment options and the authority to manage enrollment of virtualized service subscribers on behalf of the service provider.

A software virtualized oneM2M service subscriber may use the enhanced service enrollment procedure to not only enroll itself with a service provider but also the subscriber's individual IoT devices, IoT applications, IoT data sets and/or authorized users. This may be done in a single enrollment procedure resulting in the automation and simplification of the existing oneM2M enrollment process that requires each oneM2M application (AE) and device (node) to be individually enrolled. An additional benefit may be that a service subscriber may be represented as a virtualized entity in the oneM2M system having an association to its IoT devices, IoT applications, IoT data sets and/or authorized users. In the existing oneM2M architecture, there is no awareness or support for the service subscriber itself; there is only support for individual IoT applications and devices. Introducing this capability may enable the oneM2M service layer to provide additional types of automated enrollment services to the service subscriber (e.g., auto registration service subscribers and their enrolled devices and applications as well as auto configuration of the access control rights of these entities).

A oneM2M CSE, MEF or MAF may support the ASE's Service Enrollment Publishing, Query & Discovery Server Capability introduced herein. A resource or an attribute may be used by the CSE, MEF or MAF to publish a description of the types of service enrollment options the corresponding service provider supports. This description may include one or more of the types of information supported by the ASE's Service Enrollment Publishing, Query & Discovery Server Capability.

Figure 13:
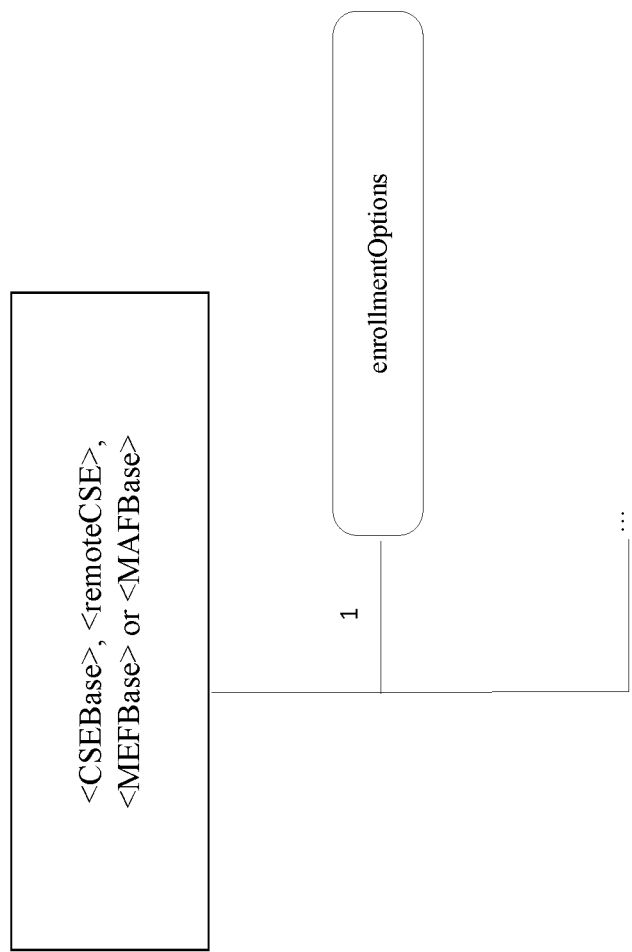
FIG. 13 illustrates an example oneM2M resource attribute.

In an example embodiment, service enrollment options may be stored in a resource attribute. For example, it may be an enrollmentOptions attribute of one or more of the oneM2M defined resource types such as <CSEBase>, <remoteCSE>, <MEFBase> or <MAFBase>, as shown in FIG. 13.

Figure 14:
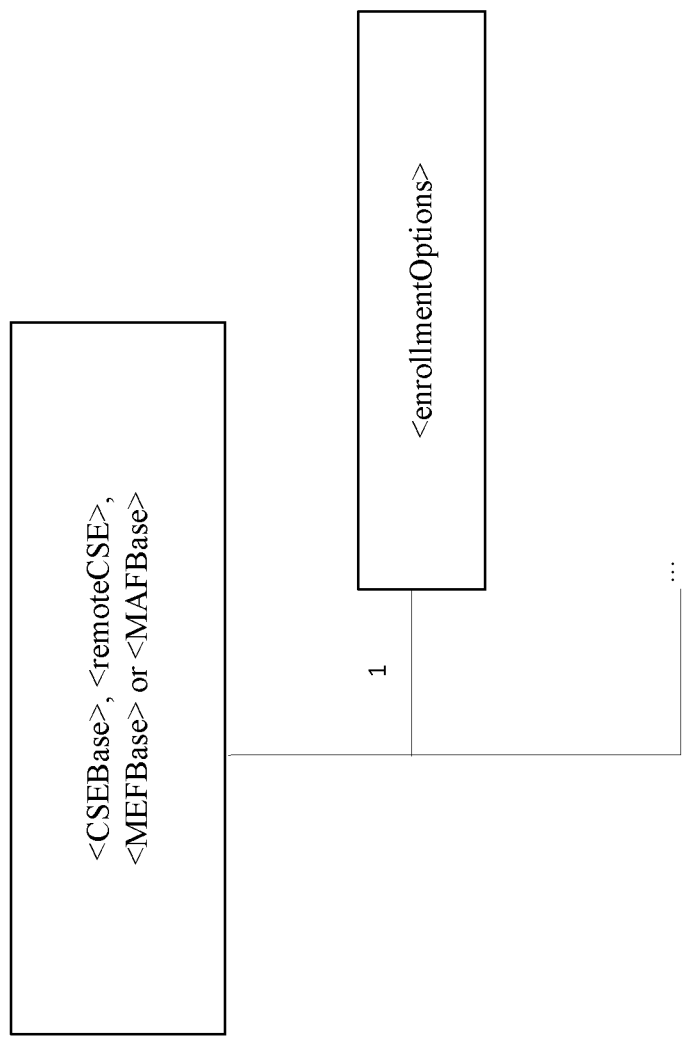
FIG. 14 illustrates an example embodiment of a new oneM2M resource.

Alternatively or additionally, such information may be stored in a new oneM2M defined resource type. For example, the information may be stored in a new enrollmentOptions child resource of one or more of the oneM2M defined resource types such as <CSEBase>, <remoteCSE>, <MEFBase> or <MAFBase>, as shown in FIG. 14.

Figure 15:
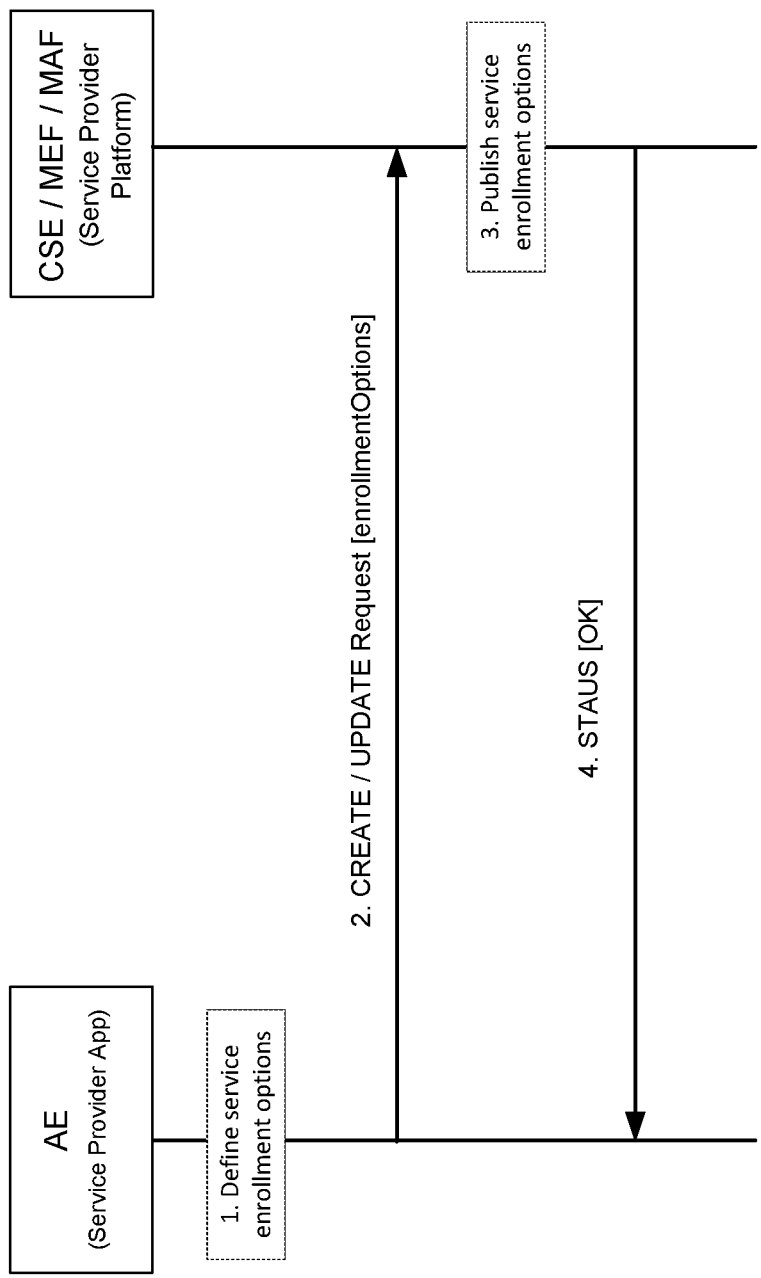
FIG. 15 illustrates an example sequence diagram to publish oneM2M service enrollment options.

This new attribute or resource may be used to publish oneM2M service provider enrollment options, as shown in FIG. 15.

At step 1, a oneM2M service provider may define the service enrollment options it supports.

At step 2, the oneM2M service provider AE may publish supported service enrollment options to a MEF, MAF or CSE within its service platform. This publishing may involve creating or updating a resource or attribute hosted on a MEF, MAF or CSE with the service enrollment options.

At step 3, the MEF, MAF or CSE may service the request by creating or updating the requested resource with the service enrollment options.

At step 4, the MEF, MAF or CSE may return a response to the service provider AE that initiated the request. A status may be included in the response indicating whether the request was successful or not.

Figure 16:
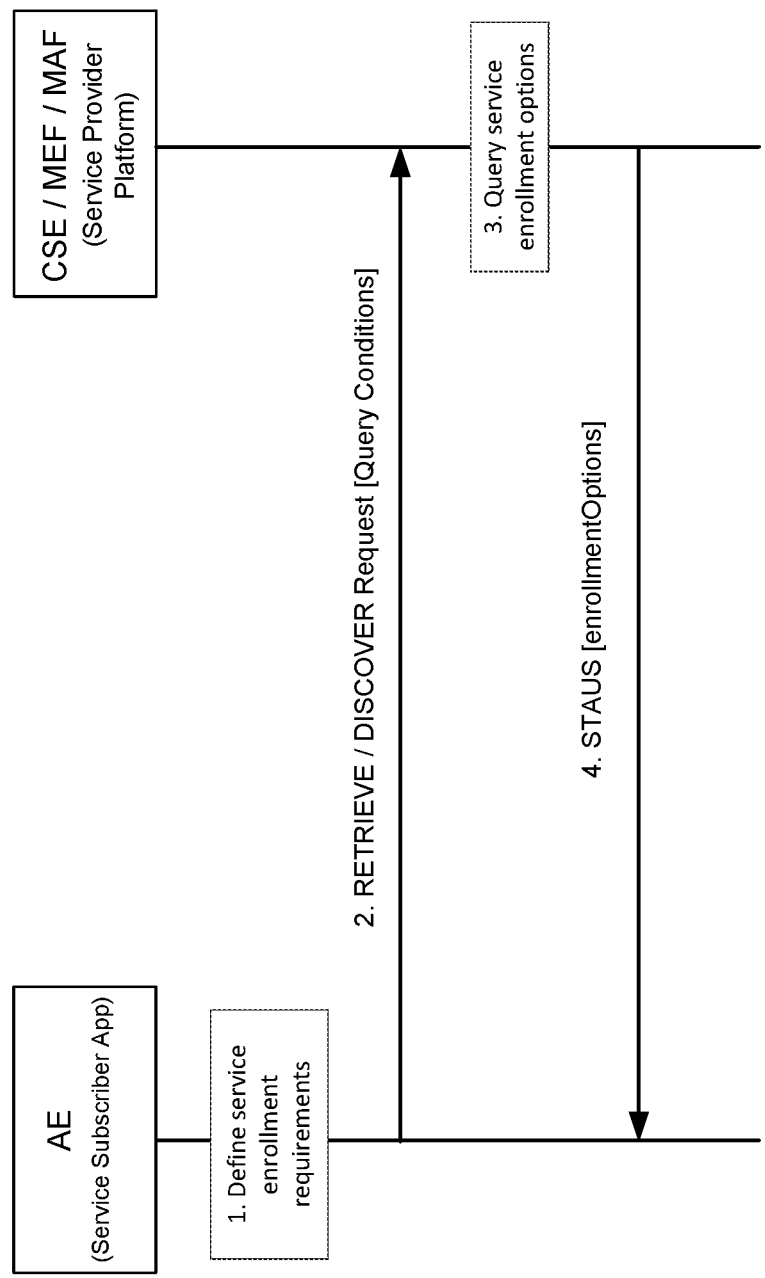
FIG. 16 illustrates an example sequence diagram to discover oneM2M service enrollment options.

Once published, the enrollmentOptions may then be queried and discovered by potential oneM2M service subscribers that may be attempting to find a oneM2M service provider that offers service enrollment options that suit the oneM2M service subscribers' requirements, as shown in FIG. 16.

At step 1, an oneM2M service subscriber may define its service enrollment requirement, which may define the type of service provider it is searching for.

At step 2, the oneM2M service subscriber AE may issue a query to discover a oneM2M service provider that supports the requirements the subscriber needs. Such a query may be targeted to a particular MEF, MAF or CSE. Alternatively, the query may be broadcast or multicast to discover available service providers in a given domain or location.

At step 3, a MEF, MAF or CSE may process the query. To process the query, the MEF, MAF or CSE may analyze the query conditions to determine whether the service provider(s) it represents match the criteria. Alternatively or additionally, the MEF, MAF or CSE may provide a complete list of enrollment options and let the AE decide on what relevant information is important for the AE.

At step 4, the MEF, MAF or CSE may return a response to the service subscriber AE that initiated the query. A status may be included in the response indicating whether the discovery was successfully processed and if any matching service provider(s) were found. In addition, service provider credential(s) (e.g., public certificate) may also be included in the response.

To enable the introduced enhancements to the oneM2M service enrollment procedure, a new type of oneM2M security association may be introduced that may be established between a virtualized service subscriber (i.e., a oneM2M AE representing a service subscriber) and a virtualized service provider (i.e., a oneM2M MEF, MAF or CSE representing a service provider). This new type of oneM2M security association may enable the establishment of trust between the virtualized service subscriber and virtualized service provider. Such trust may be established by the virtualized service subscriber authenticating that the virtualized service provider is a genuine service provider and is the virtualized service provider that the subscriber discovered and decided to enroll with. Similarly, the service provider may authenticate the service subscriber to ensure the identity of the subscriber is genuine and may be trusted. To further enable this new oneM2M security association between a virtualized service subscriber and a service provider, example embodiments of several ASE defined features are introduced within the oneM2M architecture.

One such feature to enable a oneM2M service subscriber and a oneM2M service provider to authenticate and trust one another is the introduction of two new oneM2M defined credentials: a oneM2M service subscriber credential and a oneM2M service provider credential. In an example embodiment, these credentials may take the form of pre-shared symmetric keys that may be provisioned and shared between a virtualized service subscriber AE and virtualized service provider MEF, MAF or CSE. In another example embodiment, a new oneM2M certificate profile may be introduced for a oneM2M service subscriber and another oneM2M certificate profile may be introduced for a oneM2M service provider. In the oneM2M service subscriber certificate profile, the oneM2M service subscription identifier may be included in the certificate, enabling it to become a oneM2M service subscriber certificate. For example, the oneM2M service subscription identifier may be included within the subjectAltName extension field of an SSL certificate of the service subscriber. Likewise, in the oneM2M service provider certificate profile, the oneM2M service provider identifier may be configured within the certificate, enabling it to become a oneM2M service provider certificate.

Another feature is the introduction of an API to administer as well as remotely bootstrap a virtualized service subscriber AE and a virtualized service provider's MEF, MAF or CSE with service subscriber and provider identifiers and credentials needed as pre-requisites for the establishment of the service subscriber and provider security association.

Figure 17:
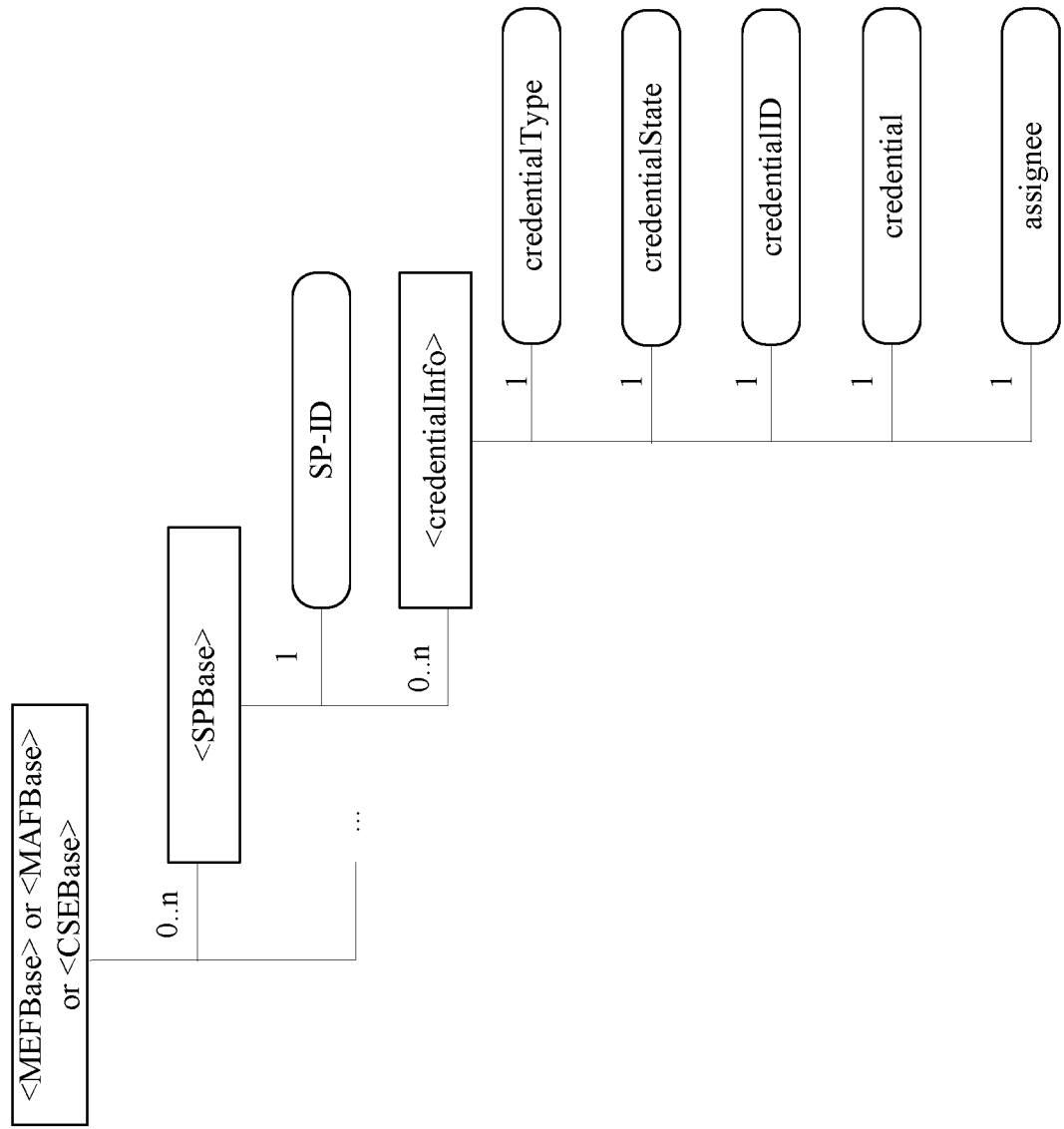
FIG. 17 illustrates an example service provider API for administering service subscriber credentials.
Figure 18:
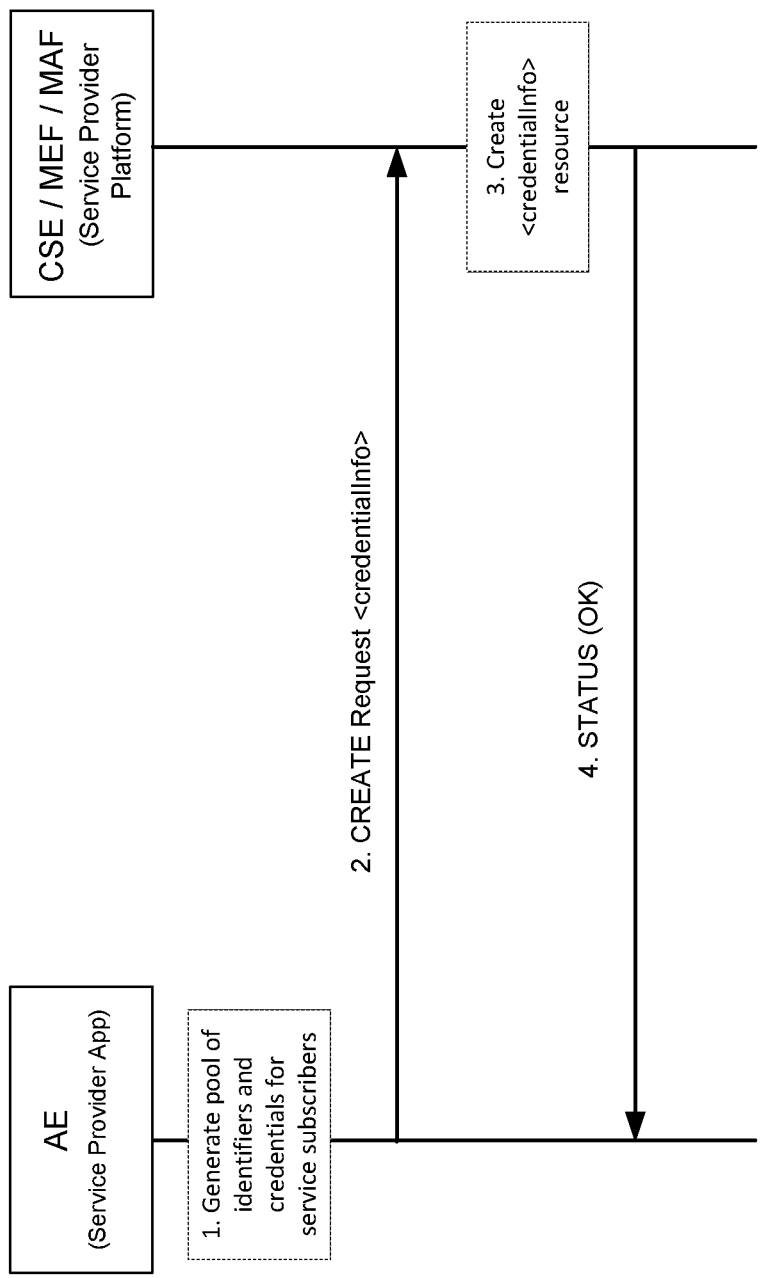
FIG. 18 illustrates an example sequence diagram to create service subscriber credentials.

A RESTful API is introduced in FIG. 17 and FIG. 18 to allow a oneM2M service provider to administer the configuration of one or more enrollment credentials. A service provider may use this API to create a pool of enrollment credentials within a oneM2M MEF, MAF or CSE. After a pool of credentials is created, the MEF, MAF or CSE may manage the distribution of the credentials to enrollees on behalf of the service provider as well as the lifecycle management of the credentials (e.g., managing expiration times, etc.). The API may comprise a base resource such as <MEFBase>, <MAFBase> or <CSEBase>, depending on which oneM2M entity hosts these API resources. Each oneM2M service provider may have its own resource (i.e., <SPBase>) as a child resource under the API's base resource. The <SPBase> resource may have attributes such as an attribute configured with the service provider identifier. The <SPBase> resource may also have child resources, such as a resource for each credential in the pool credentials that the service provider creates for potential enrollees. Each credential in the pool may have its own resource (i.e., <credentialInfo>). Such a resource may include attributes of a given credential. One attribute may be the type of credential (i.e., credentialType) that may be configured with a supported oneM2M certificate or key type. Alternatively, to keep credentials more private and secure, credentials may be kept hidden and not stored in individual resources. Instead, a resource(s) may be defined as an entry point (e.g., a virtual resource) to allow the generation and bootstrapping of a credential. Note that this more-secure option is not shown in FIGS. 17-18 below, but may comprise replacing the <credentialInfo> resources with a virtual resource. Other attributes may comprise one or more of the following: a state of the credential (i.e., credentialState) that may be configured with a value, such as unassigned or assigned, to indicate whether the credential has been assigned to an enrollee or not; an identifier of the credential (i.e., credentialID) that may be configured with a unique identifier of the credential; the credential itself (i.e., credential) that may be configured with a oneM2M compliant key or certificate for an enrollee; and an assignee of the credential (i.e., assignee) that may be configured with an identifier of the entity that the credential has been assigned to.

FIG. 18 illustrates an example procedure to create service subscriber credentials.

At step 1, a oneM2M service provider may generate a pool of service subscriber credentials and identifiers.

At step 2, for each credential in the pool, the oneM2M service provider may issue a create request to a MEF, MAF or CSE within its service platform to create a <credentialInfo> resource.

At step 3, the MEF, MAF or CSE may service this request by creating a <credentialInfo> resource for the service provider.

At step 4, the MEF, MAF or CSE may return a response to the service provider AE that initiated the request. A status may be included in the response indicating whether the request was successful or not.

Figure 19:
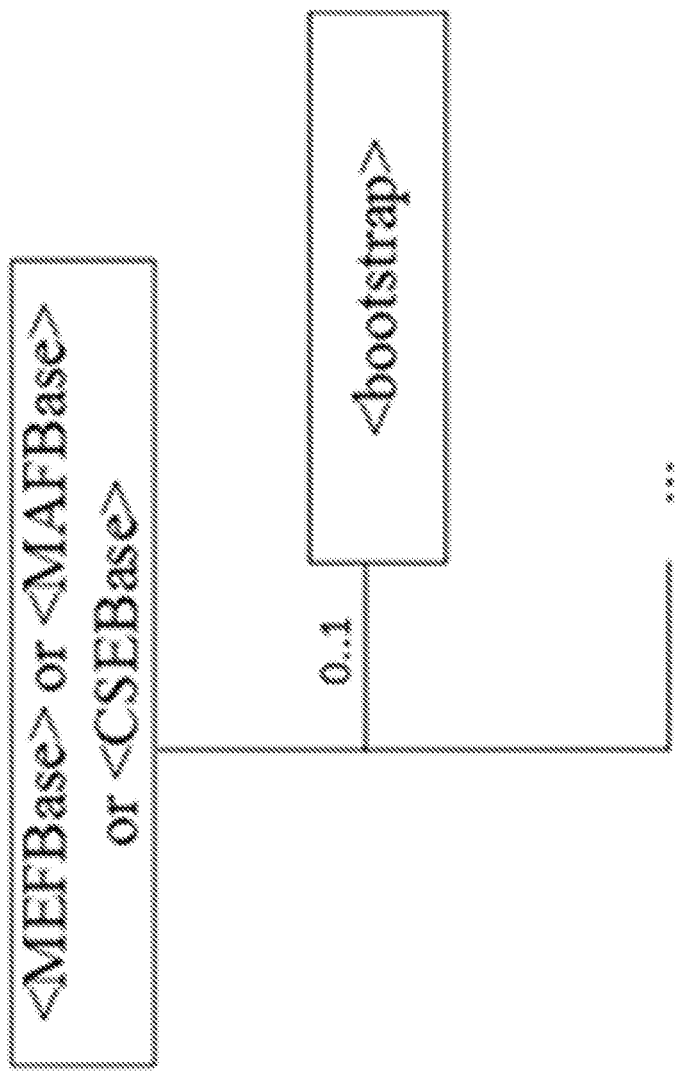
FIG. 19 illustrates an example embodiment of a oneM2M service subscriber credential boostrap API.
Figure 20:
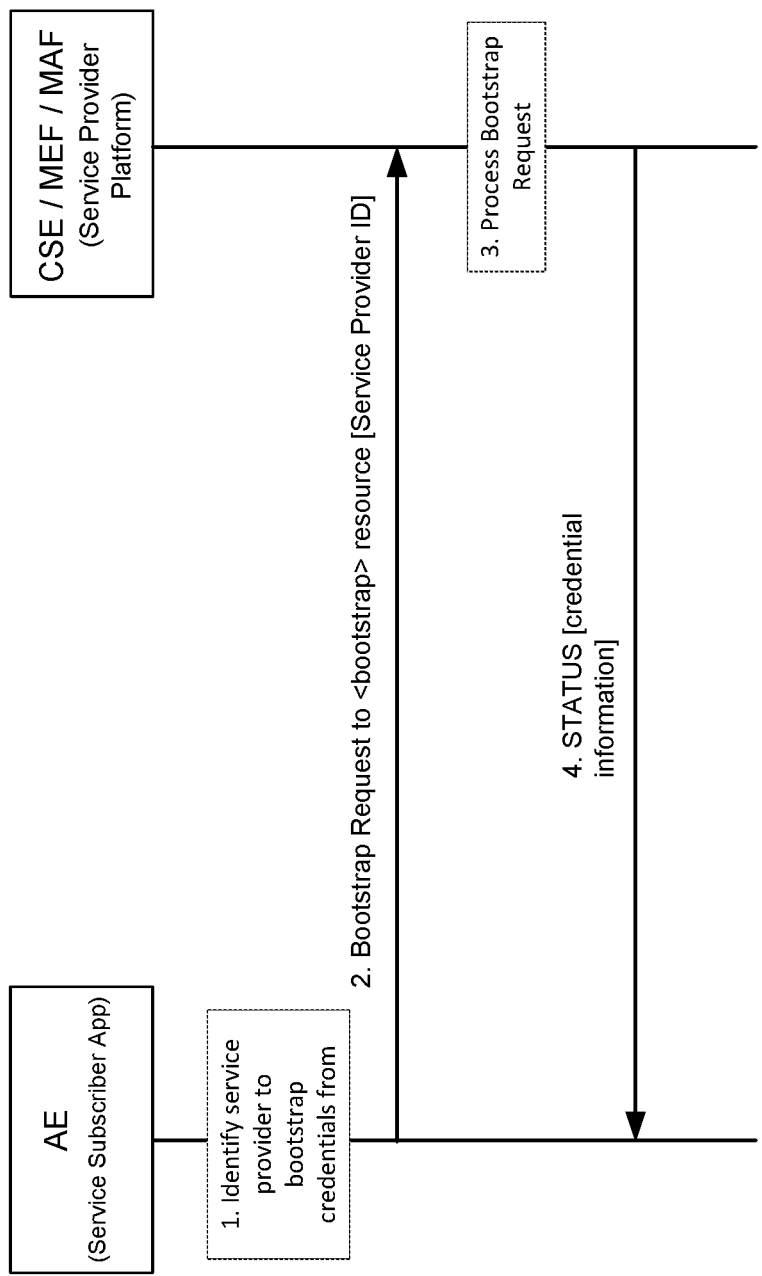
FIG. 20 illustrates an example sequence diagram to boostrap credentials.

An additional RESTful API is introduced in FIG. 19 and FIG. 20 to allow a virtualized service subscriber AE to be securely bootstrapped with the necessary service subscriber and provider identifiers and credentials required to establish a secure association between itself and the service provider. This API may comprise a credential-provisioning feature supported by a oneM2M MEF, MAF or CSE. Such a provisioning feature may allow a virtualized service subscriber AE to issue a service subscriber credential-provisioning request to a MEF, MAF or CSE. To use this API, the virtualized service subscriber AE may first be required to establish a secure association with the MEF, MAF or CSE using a pre-provisioned bootstrapping credential (e.g., pre-provisioned by a manufacturer, etc.). The API may support a virtual resource (i.e., <bootstrap>) that may be used to target bootstrap requests by a virtualized service subscriber AE. Within the request, the virtualized service subscriber AE may include information such as the identifier of the service provider it is interested in enrolling with. When receiving this request, The MEF, MAF or CSE may determine whether the targeted service provider is one that the MEF, MAF or CSE may act on behalf of. If so, the MEF, MAF or CSE may assign an available credential and identifier from available pool of credentials (if one exists) for the targeted service provider. The MEF, MAF or CSE may then return this identifier and credential to the service subscriber along with any service provider credential that may also be required (e.g., public key/certificate of the service provider).

FIG. 20 illustrates an example procedure for a service subscriber to bootstrap credentials.

At step 1, a oneM2M service subscriber may determine the service provider it wants to bootstrap service subscriber credentials from. This determination may be the result of a service provider discovery procedure that the service subscriber performs.

At step 2, the oneM2M service subscriber AE may issue a bootstrap request to a oneM2M service provider. This request may be targeted to a particular MEF, MAF or CSE associated with the service provider and discovered during a service provider discovery procedure the service subscriber may perform. Alternatively, this request may be broadcast or multicast to available service providers in a given domain or location. To secure this bootstrapping process, a bootstrapping credential may be required by the service subscriber AE. In an example embodiment, the bootstrapping credential may be obtained during the service provider discovery procedure.

At step 3, a MEF, MAF or CSE may authenticate the service subscriber AE and then may service the bootstrap request. To process the request, the MEF, MAF or CSE may analyze the specified service provider identifier in the request to determine whether it is a provider that it may service bootstrap requests on behalf of the service provider.

At step 4, the MEF, MAF or CSE may return a response to the service subscriber AE that initiated the bootstrap request. A status may be included in the response indicating whether the bootstrap was successfully processed. If so, then a credential information may also be included in the response, which may include a service subscriber credential and identifier and service provider credential information (e.g., public key/certificate of service provider).

After a security association between a oneM2M service subscriber and provider is successfully established, the security association may then be used to perform a privileged set of enrollment operations that are reserved and may only be allowed to be performed between a oneM2M service subscriber (or one of its authorized users) and service provider. The operations may be securely performed over top of this established trusted and secure association.

Figure 21:
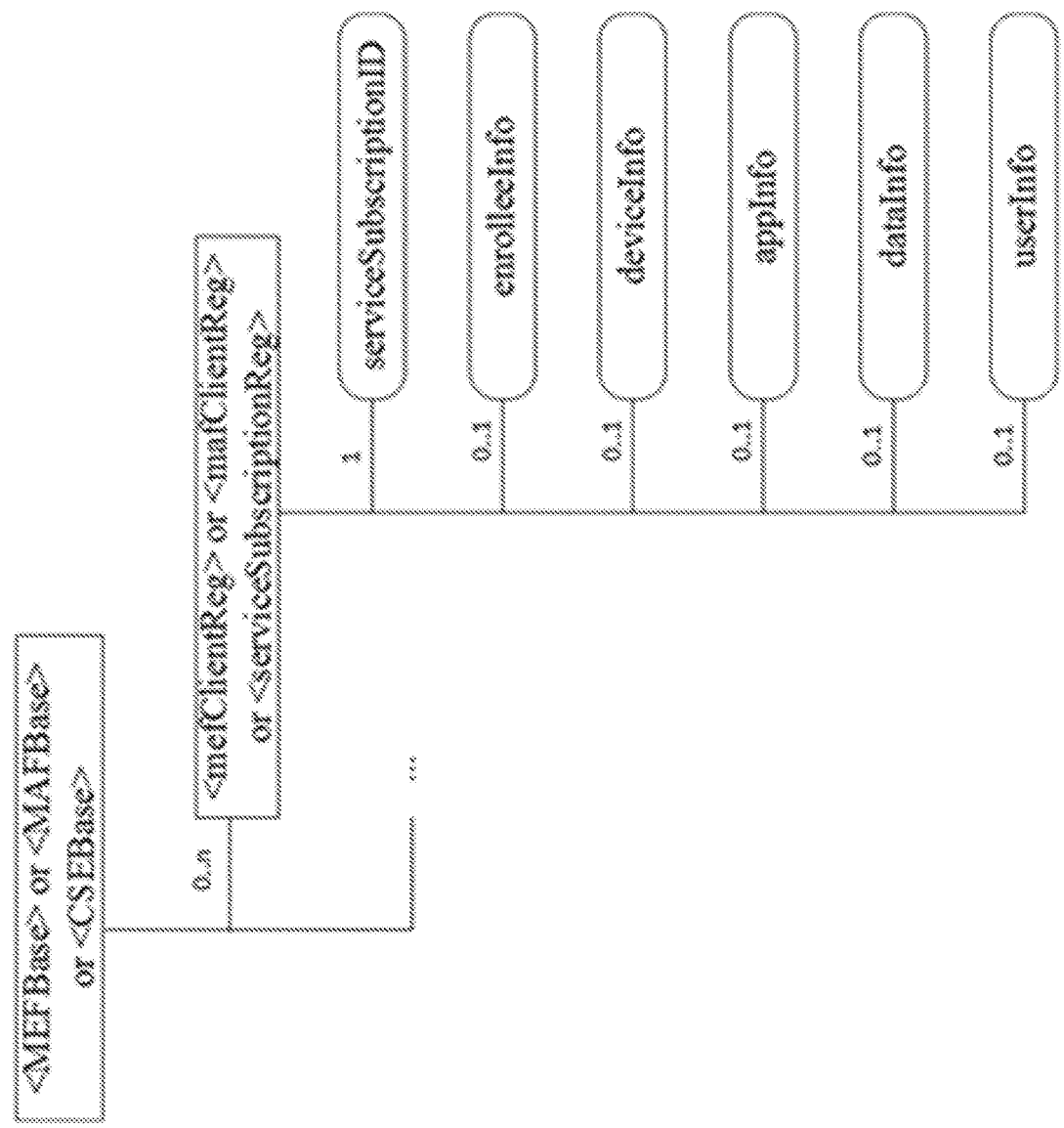
FIG. 21 illustrates an example embodiment of a oneM2M service subscriber enrollment information resource.

A service subscriber enrollment may be initiated by a virtualized oneM2M service subscriber AE. This request may include one or more types of information as introduced herein. This exchange of information may be enabled by adding example embodiments for new oneM2M defined resources and/or attributes to a MEF, MAF or CSE. A virtualized service subscriber AE may in turn, create or update these newly defined resources/attributes as part of its service subscriber enrollment process. The new resources, attributes and procedure are shown in FIG. 21 and FIG. 22.

A service subscriber may initiate an enrollment by creating an enrollment information resource on a MEF, MAF or CSE (e.g., <mefClientReg>, <mafClientReg>, <serviceSubscriptionReg>). The creation of this resource may trigger a MEF, MAF or CSE to process the request as a service subscriber enrollment request. This resource may support several attributes that a service subscriber may configure with information regarding itself (i.e., enrolleeInfo), its IoT devices (i.e., deviceInfo), its applications (i.e., appInfo), its data (i.e., dataInfo) and its users (i.e., userInfo) that it would like to include in the enrollment to the service provider. This resource may also include an attribute that may be configured with an identifier for the service subscription. This attribute may be configured by the MEF, MAF or CSE as a result of successfully processing the enrollment request and generating an identifier for the service subscription.

Figure 22:
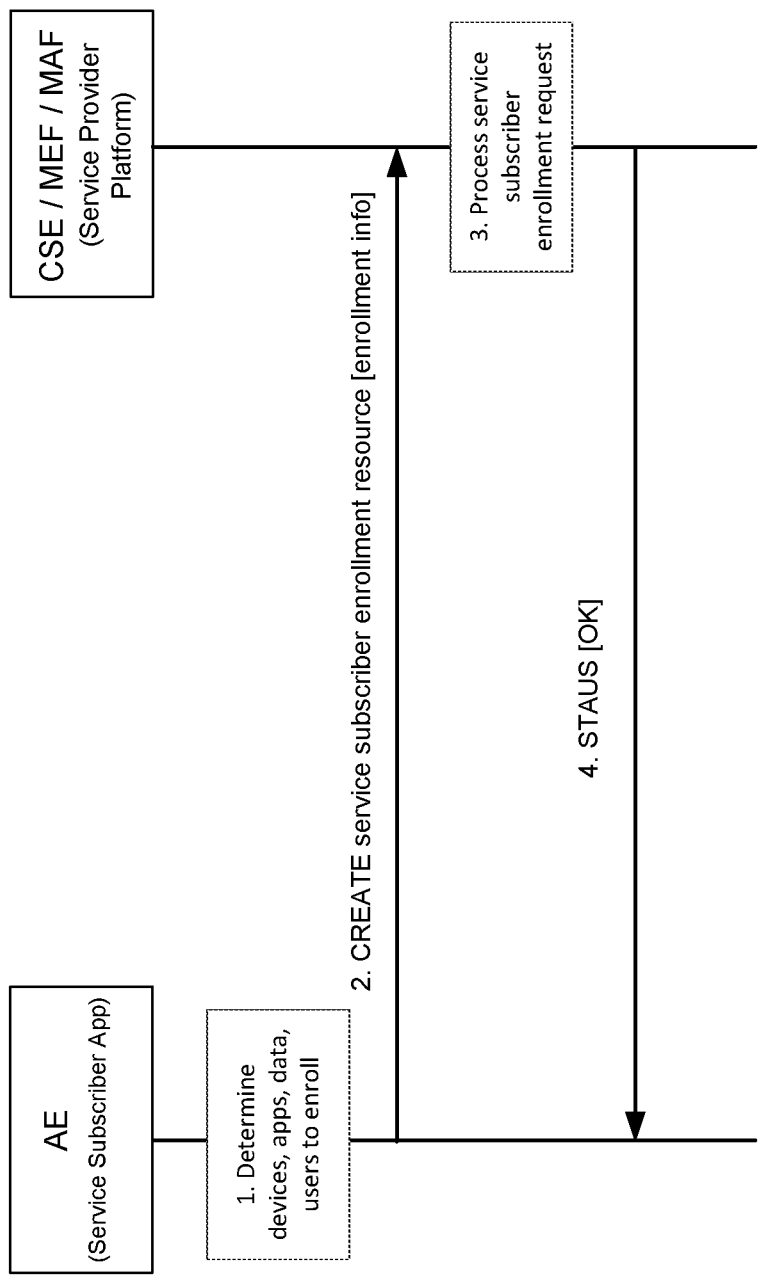
FIG. 22 illustrates an example sequence diagram for a service subscriber to enroll to a service provider.

FIG. 22 illustrates an example procedure for a service subscriber to enroll to a service provider.

At step 1, a oneM2M service subscriber may determine the IoT devices, applications, data and users to enroll to a given service provider. This determination may be made utilizing at least some of the introduced functionality of the ASE's Service Enrollee Virtualization Capability described herein.

[At step 2, the oneM2M service subscriber AE may issue an enrollment request to a oneM2M service provider. The request may be a CREATE of an enrollment resource. The resource may include enrollment information related to the service subscriber's devices, applications, data and users it would like to enroll. This request may be targeted to a particular MEF, MAF or CSE associated with the service provider that was discovered and which a security association was established with.

At step 3, a MEF, MAF or CSE may service this enrollment request. To process the request, the MEF, MAF or CSE may analyze the specified service provider identifier in the request to determine whether the service provider is a provider that the MEF, MAF or CSE may service enrollment requests on behalf of. The MEF, MAF or CSE may process this request in a manner as introduced by the ASE's Service Enrollment Capability described herein. This processing may also include some of the advanced features introduced below, which may comprise the following: auto-creation of oneM2M service subscription related resources on the IN-CSE or Registrar CSE of the enrollee (e.g., <m2mServiceSubscriptionProfile>, <serviceSubscribedNode>, <serviceSubscribedAppRule>, <serviceSubscribedUser>, <serviceSubscribedDataRule>); auto-creation of access control policies for the enrollee (e.g., creation of <accessControlPolicy> resources and configuration of accessControlPolicyIDs); and auto-creation of data control policies and resources for the import and storage of an enrollee's IoT data sets.

At step 4, the MEF, MAF or CSE may return a response to the service subscriber AE that initiated the enrollment request. A status may be included in the response indicating whether the enrollment was successfully processed.

In another example embodiment, a oneM2M service provider's MEF, MAF or CSE processing the enrollment request it may have received from a virtualized oneM2M service subscriber AE may trigger and perform one or more of the advanced operations introduced by the ASE's Service Enrollment Capability described herein.

In an example embodiment, the service provider's MEF, MAF or CSE may auto-create, on behalf of a service provider, a collection of resources that may be used by a Registrar CSE to authorize the registration and authorize access to IoT devices, applications, data of an enrolled service subscriber. These resources may be configured with information such as the identifiers of the devices, applications and data that may be allowed to access the system as well as the identifiers of entities that may be allowed to access the devices, applications and data. The set of authorization related resources that may be auto-generated at the time of enrollment by a MEF, MAF or CSE may include some existing oneM2M resource types as well as some new resource types introduced herein. The set of existing resources may comprise <m2mServiceSubscriptionProfile>, <serviceSubscribedNode>, <serviceSubscribedAppRule> and <accessControlPolicy>. The set of new resources may comprise <serviceSubscribedUser>, <serviceSubscribedDataRule> and <dataControlPolicy>. Examples of each of these resources are illustrated in a corresponding figure below. Note that for the existing oneM2M resource types, only the newly introduced or modified attributes are shown. The auto-creation of these resources may be triggered by the successful enrollment of a service subscriber AE. The information configured within the attributes of these resources may be contingent upon the information provided by the service subscriber in its enrollment request(s) and/or policies configured within the MEF, MAF or CSE by the service provider.

Figure 23:
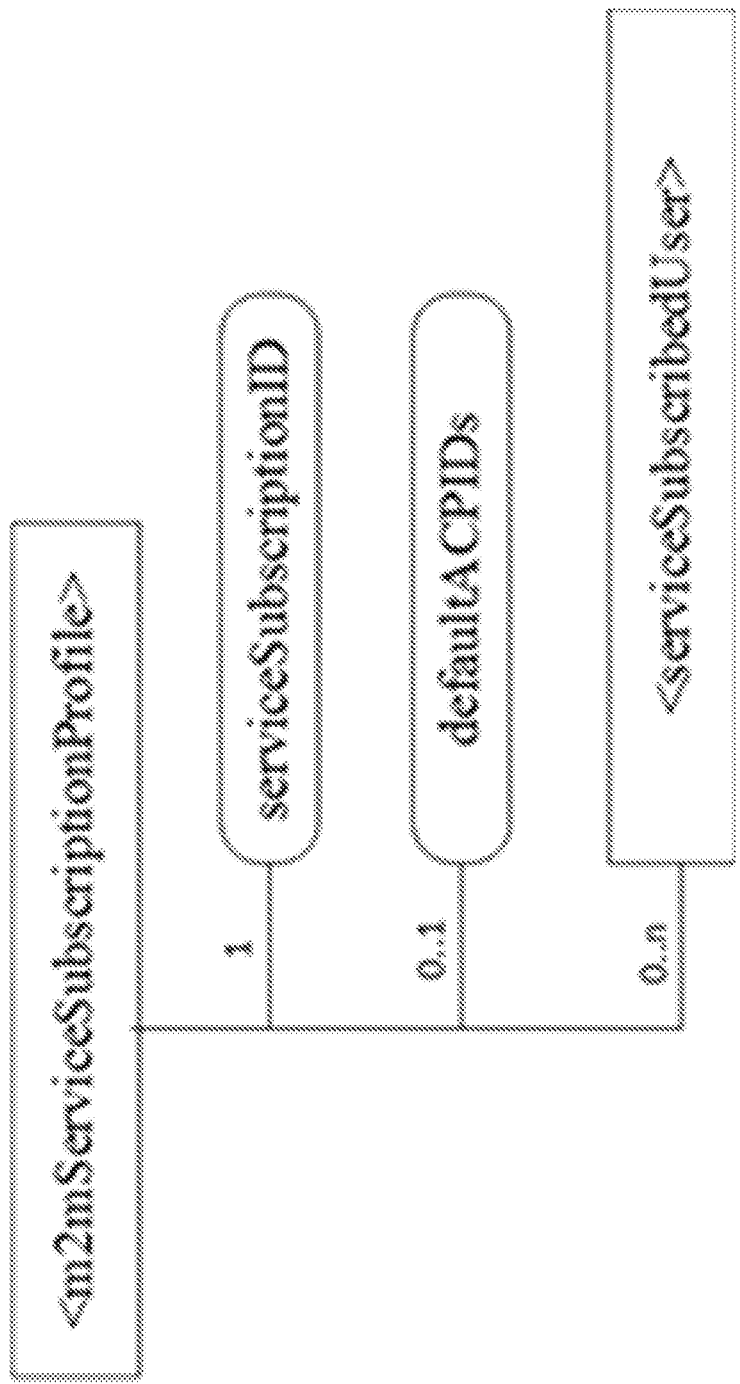
FIG. 23 illustrates an example embodiment of a new oneM2M resource.

FIG. 23 illustrates an enhanced <m2mServiceSubscriptionProfile> resource that may be auto-generated when a service subscriber successfully enrolls. The information in the new <serviceSubscriptionReg> resource may be used to auto-generate a corresponding <m2mServiceSubscriptionProfile> resource. A new serviceSubscriptionID attribute is introduced to uniquely identify and track the subscription. A defaultACPIDs attribute is introduced, which may be configured with a link to an <accessControlPolicy> resource that may be configured with privileges the enrollee may define in its enrollment request. These privileges may serve as defaults for the IoT devices, applications and data enrolled under the service subscription. Additional privileges may be defined to override these defaults. A <serviceSubscribedUser> child resource is introduced, which may contain information for an authorized user associated with this service subscription. An instance of this resource may be created for each authorized user.

Figure 24:
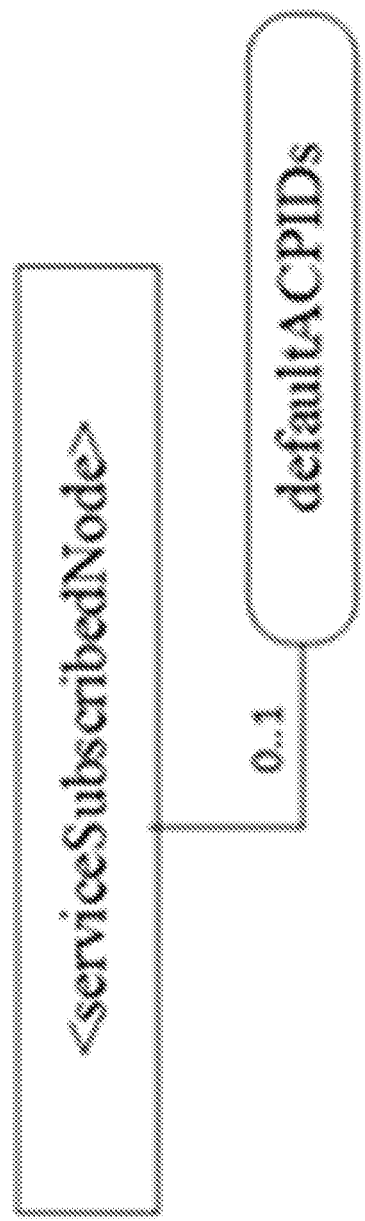
FIG. 24 illustrates an example embodiment of another new oneM2M resource.

FIG. 24 illustrates an enhanced <serviceSubscribedNode> resource that may be auto-generated when a service subscriber successfully enrolls an IoT device. A defaultACPIDs attribute is introduced, which may be configured with a link to a <accessControlPolicy> resource that may be configured with privileges the enrollee may define in its enrollment request. These privileges may serve as defaults for the IoT applications and data that are associated with this particular node. Additional privileges may be defined to override these defaults.

Figure 25:
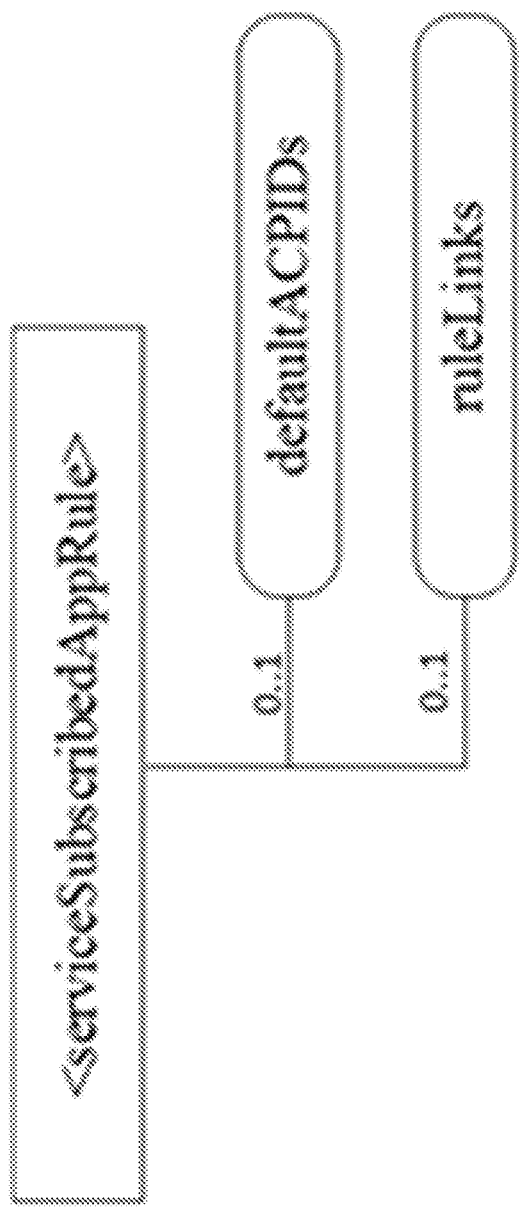
FIG. 25 illustrates an example embodiment of another new oneM2M resource.

FIG. 25 illustrates an enhanced <serviceSubscribedAppRule> resource that may be auto-generated when a service subscriber successfully enrolls. A defaultACPIDs attribute is introduced, which may be configured with a link to a <accessControlPolicy> resource that may be configured with privileges the enrollee may define in its enrollment request. These privileges may serve as defaults for a given IoT application and data that is associated with it. Additional privileges may be defined to override these defaults. Also introduced is a ruleLinks attribute. This attribute may be configured with a link to one or more <serviceSubscribedDataRule> resources.

Figure 26:
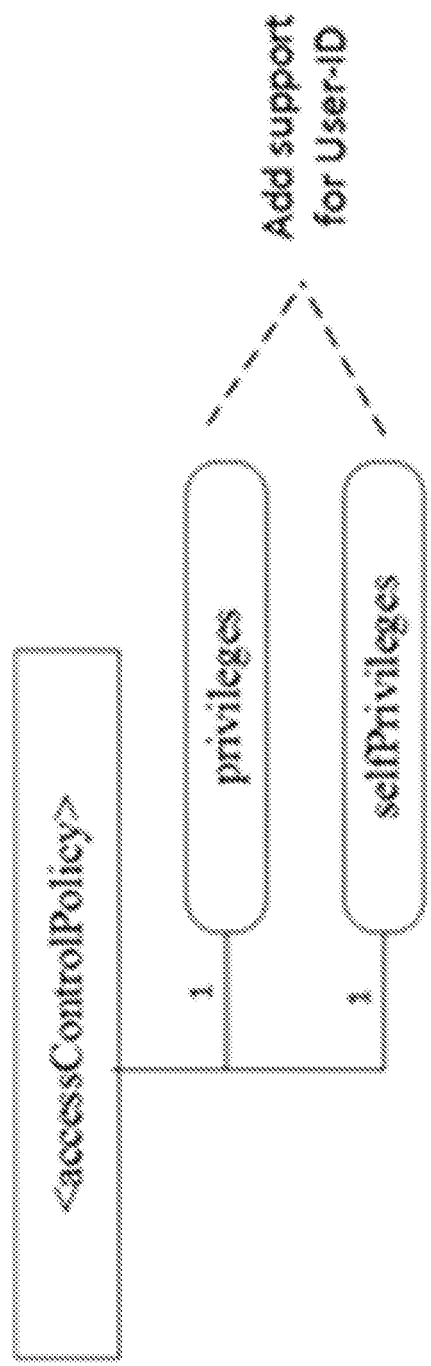
FIG. 26 illustrates an example embodiment of another new oneM2M resource.

FIG. 26 illustrates an enhanced <accessControlPolicy> resource that may be auto-generated when a service subscriber successfully enrolls. An enhancement to the privileges and selfPrivileges attributes is introduced to add support for user identifiers. As introduced herein, access control privileges may be defined in terms of a user identifier. In doing so, requests received from a particular user may be authorized and granted access. Also introduced herein is an enhancement to the oneM2M request primitive, which may allow a User-ID to be included in a request parameter such that it may be checked against <accessControlPolicy> privileges. In an example embodiment, the User-ID may be included in the existing oneM2M From request parameter. In another example embodiment, the User-ID may be added as a new request parameter.

Figure 27:
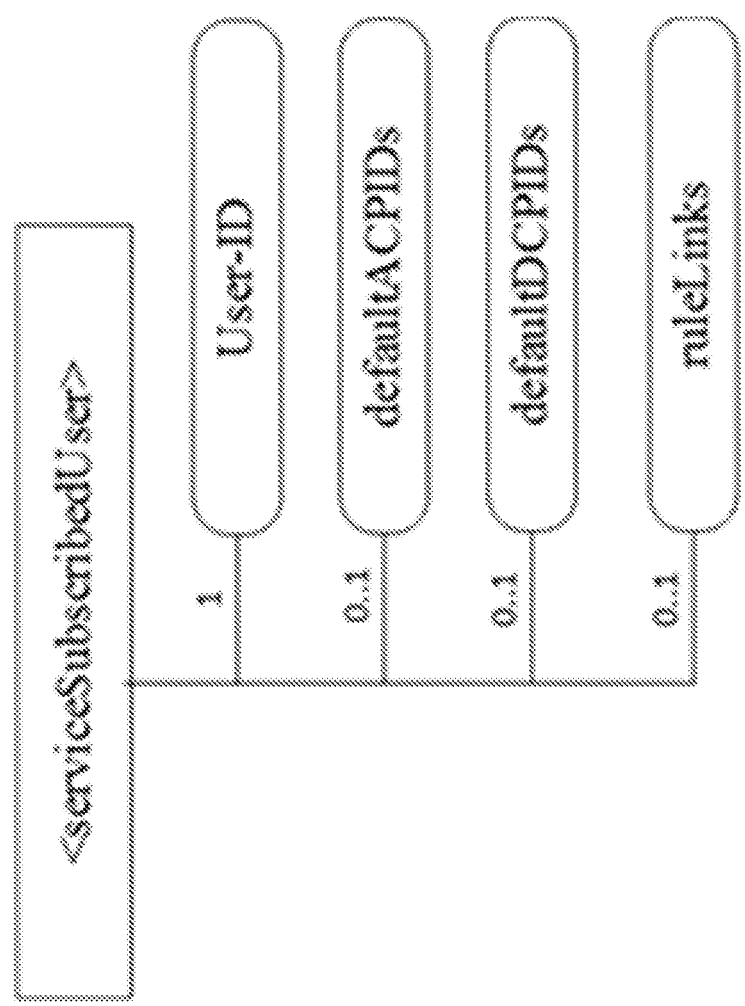
FIG. 27 illustrates an example embodiment of another new oneM2M resource.

FIG. 27 illustrates the newly introduced <serviceSubscribedUser> resource that may be auto-generated when a service subscriber successfully enrolls. A User-ID attribute is introduced and may be configured with the identifier of the user. A defaultACPIDs attribute is introduced, which may be configured with a link to a <accessControlPolicy> resource that may be configured with privileges the enrollee may define in its enrollment request. These privileges may serve as defaults for a given user. Additional privileges may be defined to override these defaults. A defaultDCPIDs attribute is also introduced. This attribute may be configured with a link to a <dataControlPolicy> resource, which may be configured with privileges the enrollee may define in its enrollment request. These privileges may serve as defaults for a given user. Additional privileges may be defined to override these defaults. Also introduced is a ruleLinks attribute. This attribute may be configured with a link to one or more <serviceSubscribedAppRule> or <serviceSubscribedDataRule> resources. This attribute may serve as another mechanism to specify rules regarding the applications and data that a user may be allowed to access.

Figure 28:
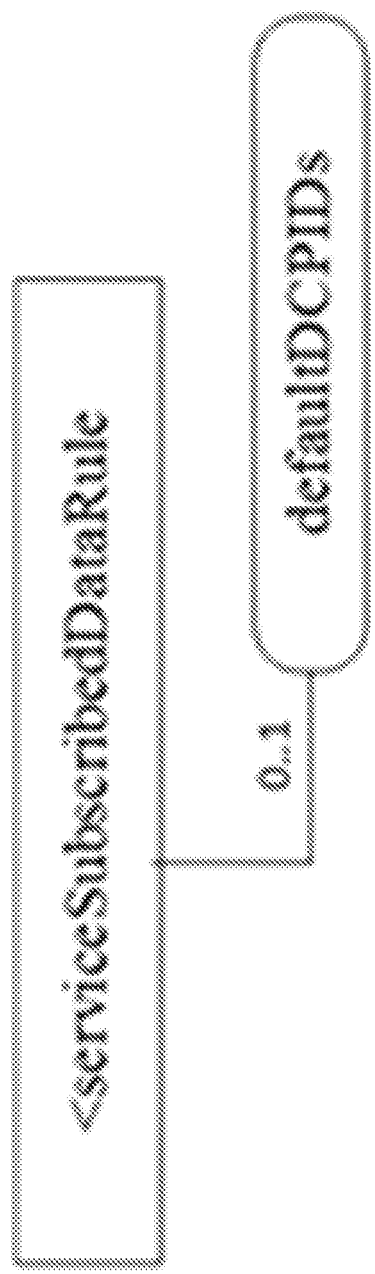
FIG. 28 illustrates an example embodiment of another new oneM2M resource.

FIG. 28 illustrates the newly introduced <serviceSubscribedDataRule> resource that may be auto-generated when a service subscriber successfully enrolls. A defaultDCPIDs attribute is introduced, which may be configured with a link to a <dataControlPolicy> resource that may be configured with privileges the enrollee may define in its enrollment request. Additional privileges may be defined to override these defaults.

Figure 29:
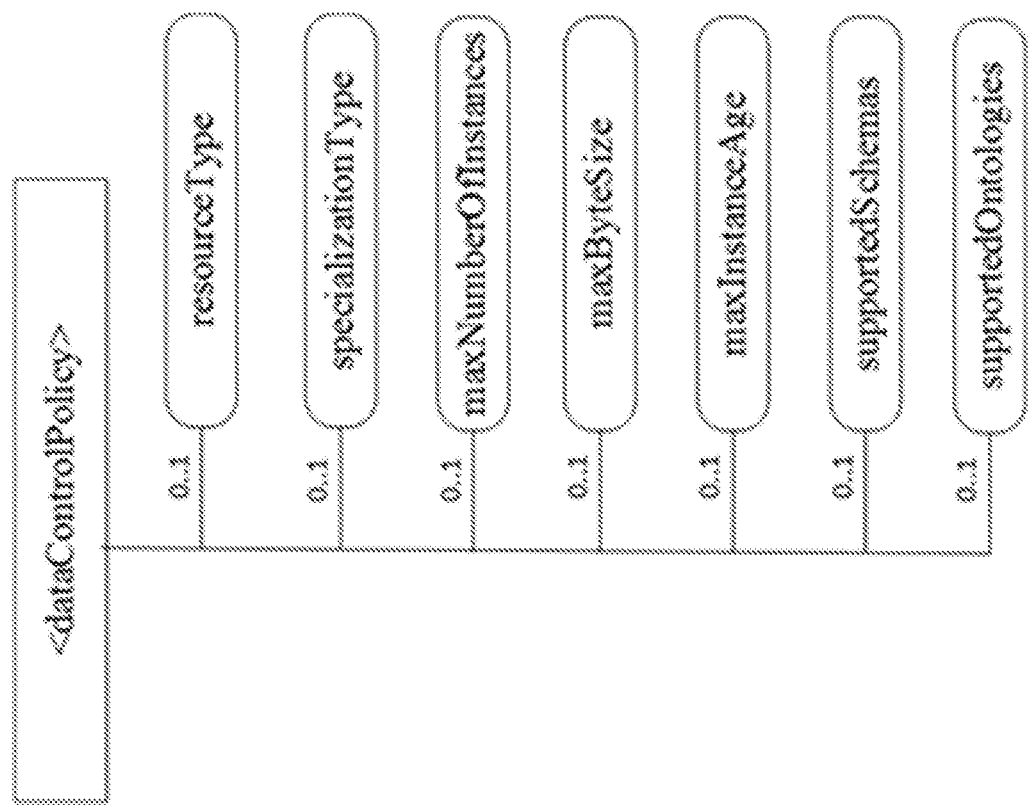
FIG. 29 illustrates an example embodiment of another new oneM2M resource.

FIG. 29 illustrates the newly introduced <dataControlPolicy> resource that may be auto-generated when a service subscriber successfully enrolls. Several attributes are introduced. A resourceType attribute may be configured with one or more resourceTypes that this policy is applicable to. A specializationType attribute may be configured with one or more types of <flexContainer> specialization types that this policy is applicable to. A maxNrOfInstances attribute may be configured with a policy limit on the max number of contentInstances or timeSeriesInstances permitted in a given container or timeSeries. A maxByteSize attribute may be configured with a max limit of bytes that may be stored in a data storage resource such as a <container>, <flexContainer> or <timeSeries>. A maxInstanceAge attribute may be configured with a max limit on the age of a <contentInstance> or <timeSeriesInstance> resource. A supportedSchemas attribute may be configured with one or more allowed schemas for content that is allowed to be stored in a data storage resource. A supportedOntologies attribute may be configured with one or more allowed ontologies for content that is allowed to be stored in a data storage resource.

In another example embodiment, the service provider's MEF, MAF or CSE may auto-create oneM2M <node> and/or <AE> resources on behalf of a virtualized service subscriber for each of its enrolled IoT devices and/or IoT applications. In doing so, the IoT devices and applications may be simpler and may not have to perform these steps themselves. Rather than the AE-IDs and node-IDs being returned to a service subscriber when the subscriber's applications or devices explicitly create the <AE> or <node> resources, these identifiers may be returned in an enrollment response. For example, a resource-constrained device may not have to perform a oneM2M AE registration because this registration may be done automatically on its behalf at the time of service subscriber enrollment.

In another example embodiment, the service provider's MEF, MAF or CSE may auto-create oneM2M data storage policies as well as resources for the import and storage of a virtualized service subscriber's enrolled IoT data sets. In doing so, the IoT devices and applications may be simpler and may not have to perform this step themselves. For example, applicable types of oneM2M storage based resources may include <container>, <contentInstance>, <flexContainer>, <timeSeries> or <timeSeriesInstance>).

In another example embodiment, the service provider's MEF, MAF or CSE may auto-create oneM2M <accessControlPolicy> resource(s) and may configure the authorization privileges within these resources on behalf of a service subscriber and/or the IoT devices, applications, data sets and/or users it is enrolling. The creation, configuration and linking of the resources and privileges may be contingent on information (e.g., policies) provided by the service subscriber in its enrollment request as well as policies defined by the service provider. This auto-creation, configuration and linking of <accessControlPolicy> resources may be triggered if/when auto-creation of other resources (e.g., <AE>, <node>, <container>, <flexContainer>, <timeSeries>, <timeSeriesInstance>, <contentInstance>) is performed by a MEF, MAF or CSE during the enrollment process. In addition, triggering may also occur after enrollment is completed and after an AE creates additional resources some time later. If/when this occurs, a MEF, MAF may perform these actions at this time as well.

Figure 30:
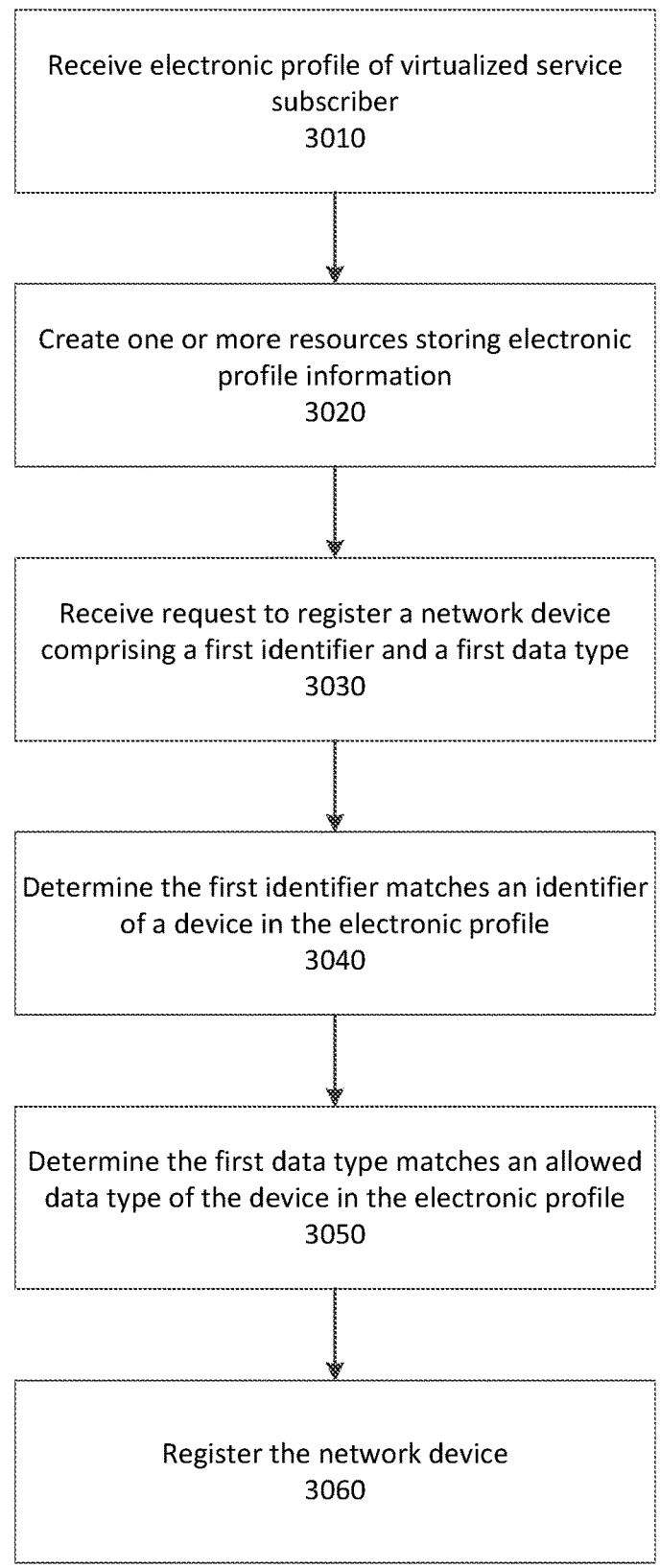
FIG. 30 is a flow diagram depicting an example process for enrolling and registering at least one device of a virtualized service subscriber with a service layer entity.

FIG. 30 is a flow diagram depicting an example process for enrolling and registering at least one device of a virtualized service subscriber with a service layer entity.

At block 3010, a service layer entity may receive an electronic profile comprising information concerning a user of a plurality of network devices that may be connected to a communications network and information concerning each of the plurality of network devices. The information concerning each network device may comprise at least an associated identifier of the network device and an associated data control policy comprising one or more allowed data types. An allowed data type of the one or more allowed data types may comprise a format of data. The electronic profile may further comprise at least one of the following: one or more allowed applications; one or more authorized users; one or more selected service enrollment electives; one or more specified access privileges; and one or more service enrollment lifetimes.

At block 3020, the service layer entity may create, in the memory of the service layer entity, one or more resources. The service layer entity may store within the one or more resources the information contained in the electronic profile concerning the user and concerning each of the plurality of network devices, including the associated identifier and associated data control policy of each network device in the electronic profile.

At block 3030, the service layer entity may receive, from a network device connected to the communications network, an electronic request to register the network device with the service layer entity. The request may comprise a first identifier and a first data type of data the requesting network device is configured to transmit on the communications network.

At block 3040, the service layer entity may determine, based on the one or more resources, that the first identifier of the requesting network device matches an associated identifier of one of the plurality of devices in the electronic profile.

At block 3050, the service layer entity may also determine, based on the one or more resources, that the first data type of the requesting device matches one of the allowed data types of the associated data control policy of the device having the matching identifier in the electronic profile.

At block 3060, the service layer entity may register, based on the determinations, the requesting device with the service layer entity.

After registration, the service layer entity may determine the requesting device is producing a second data type and that the second data type does not match one or more of the allowed data types of the associated data control policy of the device having the matching identifier in the electronic profile. The service layer entity may then unregister the requesting device.

Figure 31:
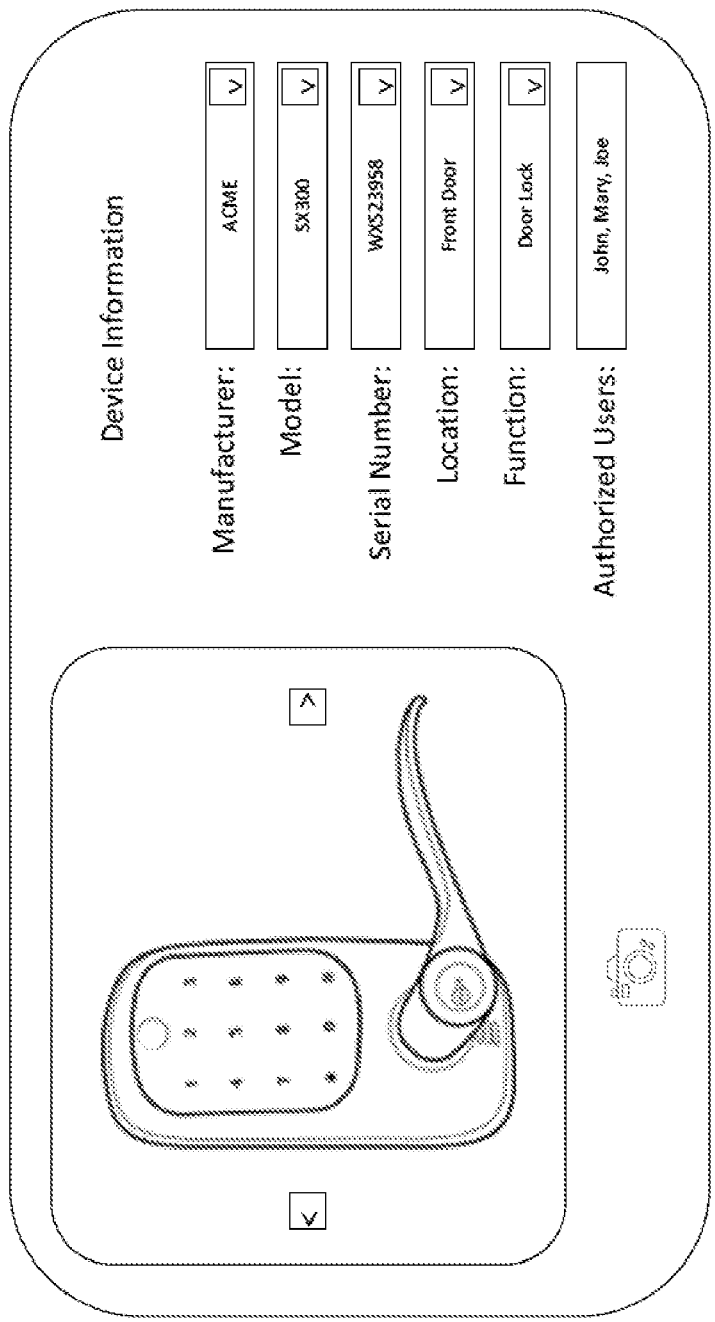
FIG. 31 is an example graphical user interface.

A user interface as shown in FIG. 31 may be implemented to assist a service enrollee with the software virtualization of itself as well as its IoT devices, applications, data sets and authorized users. In particular, the interface may have a graphical user interface (GUI) that allows a user to input desired values for the parameters or access values of the parameters during entity setup and deployment. The user interface may support the use of photos for the automation of IoT service enrollee virtualization. For example, information such as the device's manufacturer, model and serial number may be extracted from a photo, from information printed on the device or comparison of the device image against a database of IoT device images to find a match. Other types of information that may also be extracted or inferred from the photo may be the location and use of the IoT device. The user interface may also be used to ask an enrollee questions regarding the IoT device such as which users it may authorize to access and use the device. As may be seen in FIG. 31, input boxes and/or selection buttons may be used to enter or change attributes.

Example Environment

Figure 32A:
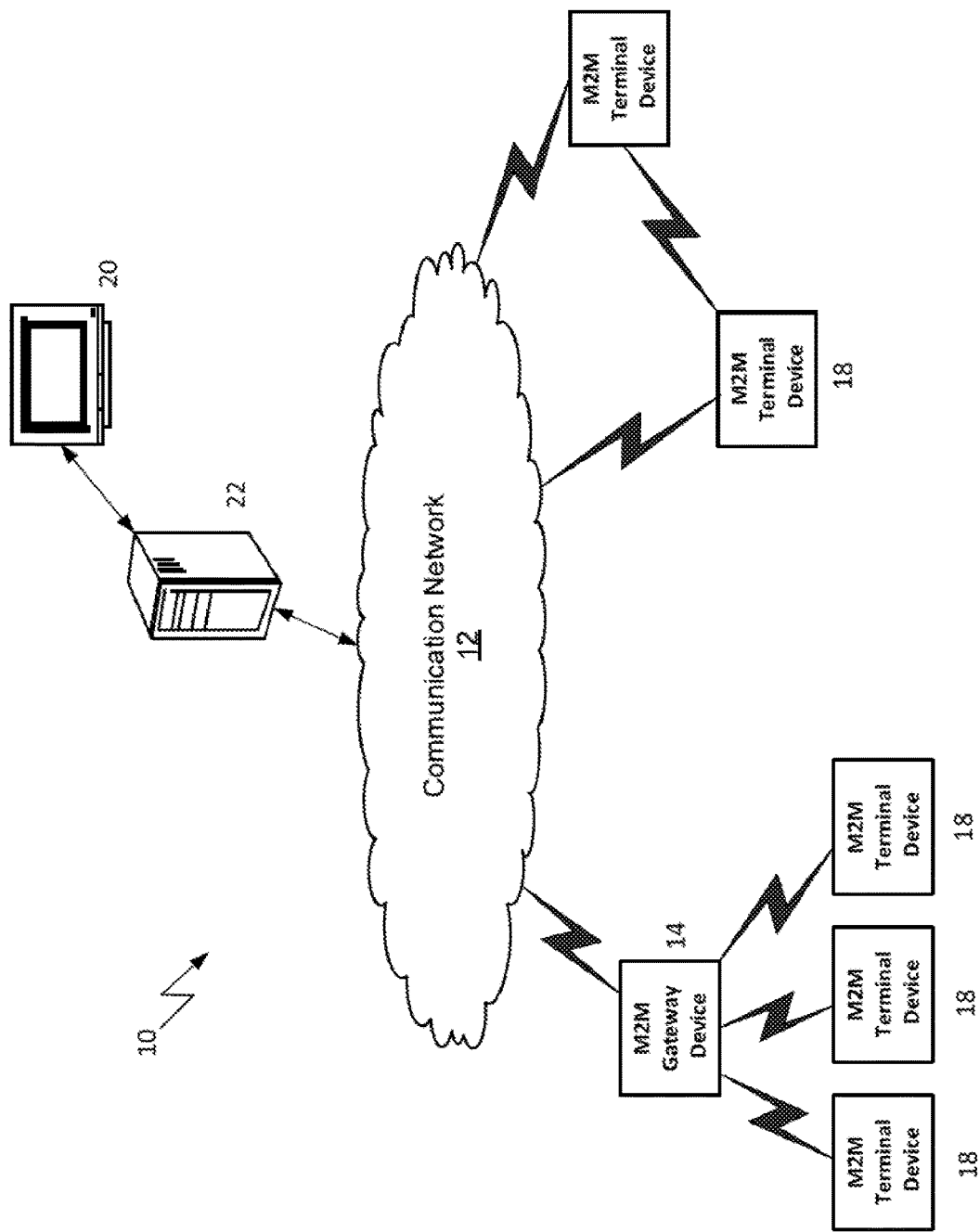
FIG. 32A is a system diagram of an example machine-to-machine (M2M), Internet of Things (IoT), or Web of Things (WoT) communication system in which one or more disclosed embodiments may be implemented.

FIG. 32A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 1, 3-6, 8-12, 15, 16, 18, 20, or 22 may comprise a node of a communication system, such as the ones illustrated in FIGS. 32A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 32A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 32A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 32B:
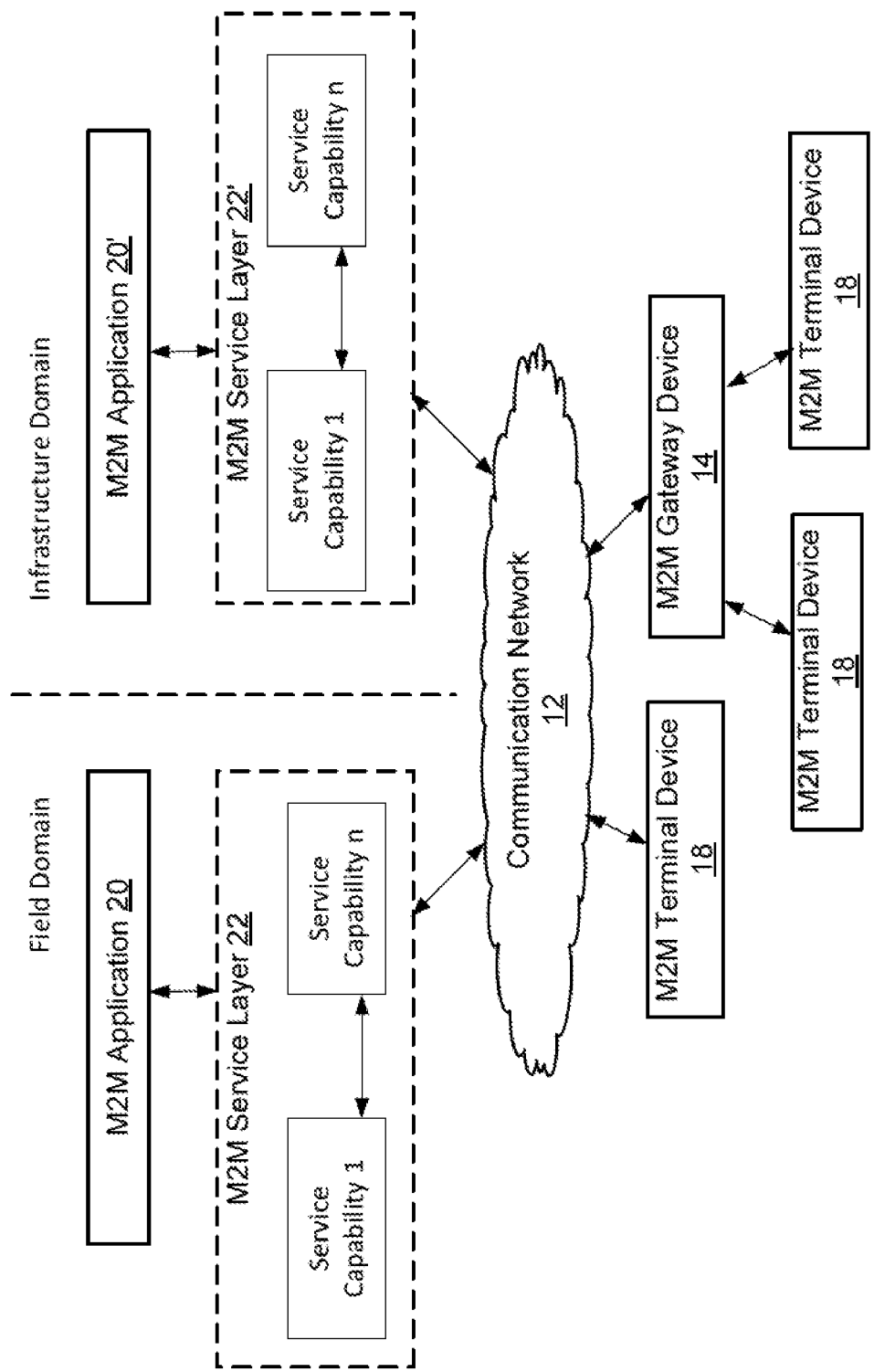
FIG. 32B is a system diagram of an example architecture that may be used within the M2M/IoT/WoT communications system illustrated in FIG. 32A.

Referring to FIG. 32B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 32B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 32B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 32C or FIG. 32D described below.

Further, the methods and functionalities described herein may be implemented as part of an M2M network that uses a Service Oriented Architecture (SOA) and/or a Resource-Oriented Architecture (ROA) to access services.

Figure 32C:
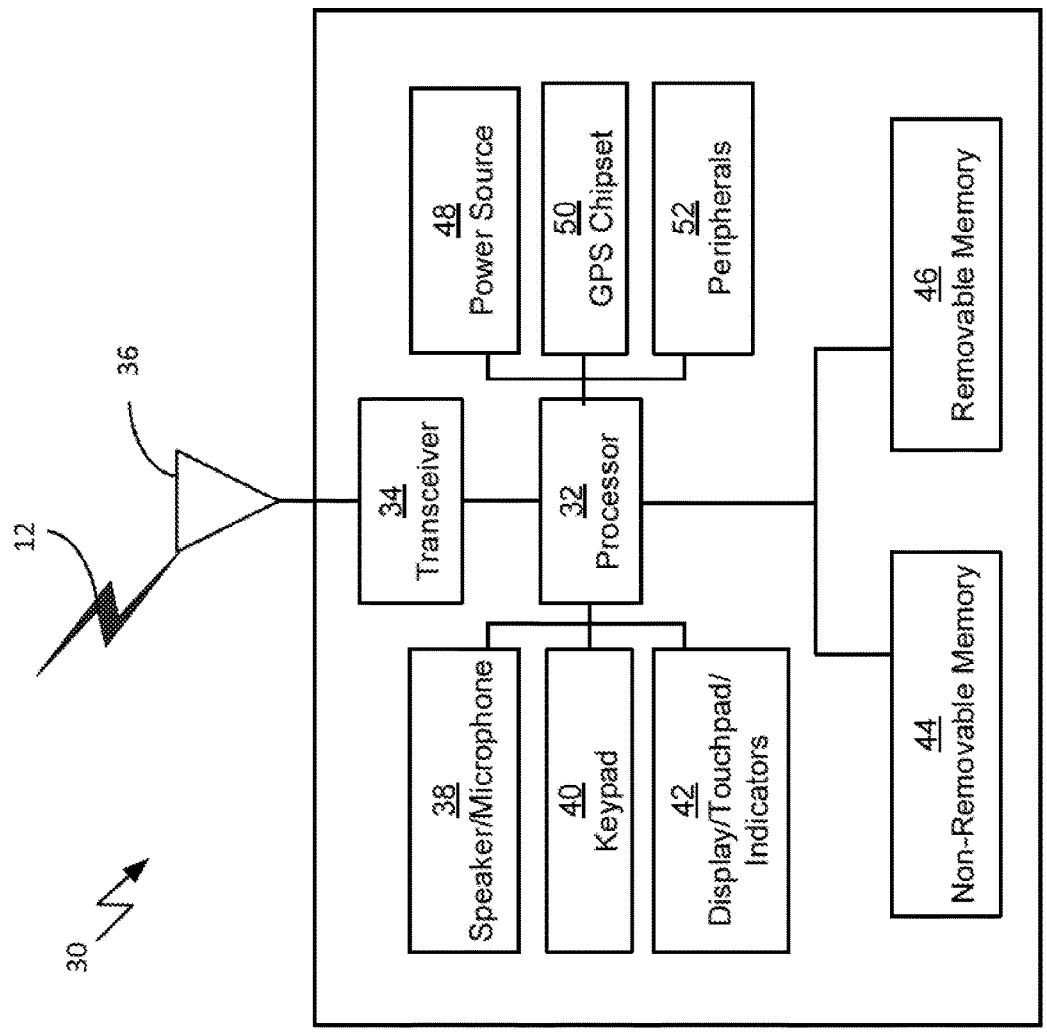
FIG. 32C is a system diagram of an example communication network apparatus, such as an M2M/IoT/WoT device, gateway, or server that may be used within the communications system illustrated in FIGS. 32A and 32B.

FIG. 32C is a block diagram of an example hardware/software architecture of a node of a network, such as one of the clients, servers, or proxies illustrated in FIG. 1, 3-6, 8-12, 15, 16, 18, 20, or 22, which may operate as an M2M server, gateway, device, or other node in an M2M network such as that illustrated in FIGS. 32A and 32B. As shown in FIG. 32C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the automated IoT service enrollment described herein, e.g., in relation to the methods described in reference to FIGS. 7, 15, 16, 18, 20, 22, and 30, or the data structures of FIGS. 1-6, 8-14, 17, 19, 21, and 23-29, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 32C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 7, 15, 16, 18, 20, 22, and 30) and in the claims. While FIG. 32C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 32C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node, and in particular underlying networks, applications, or other services in communication with the node. In one embodiment, the display/indicators 42 may present the graphical user interface illustrated in FIG. 31 and described herein.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 32D:
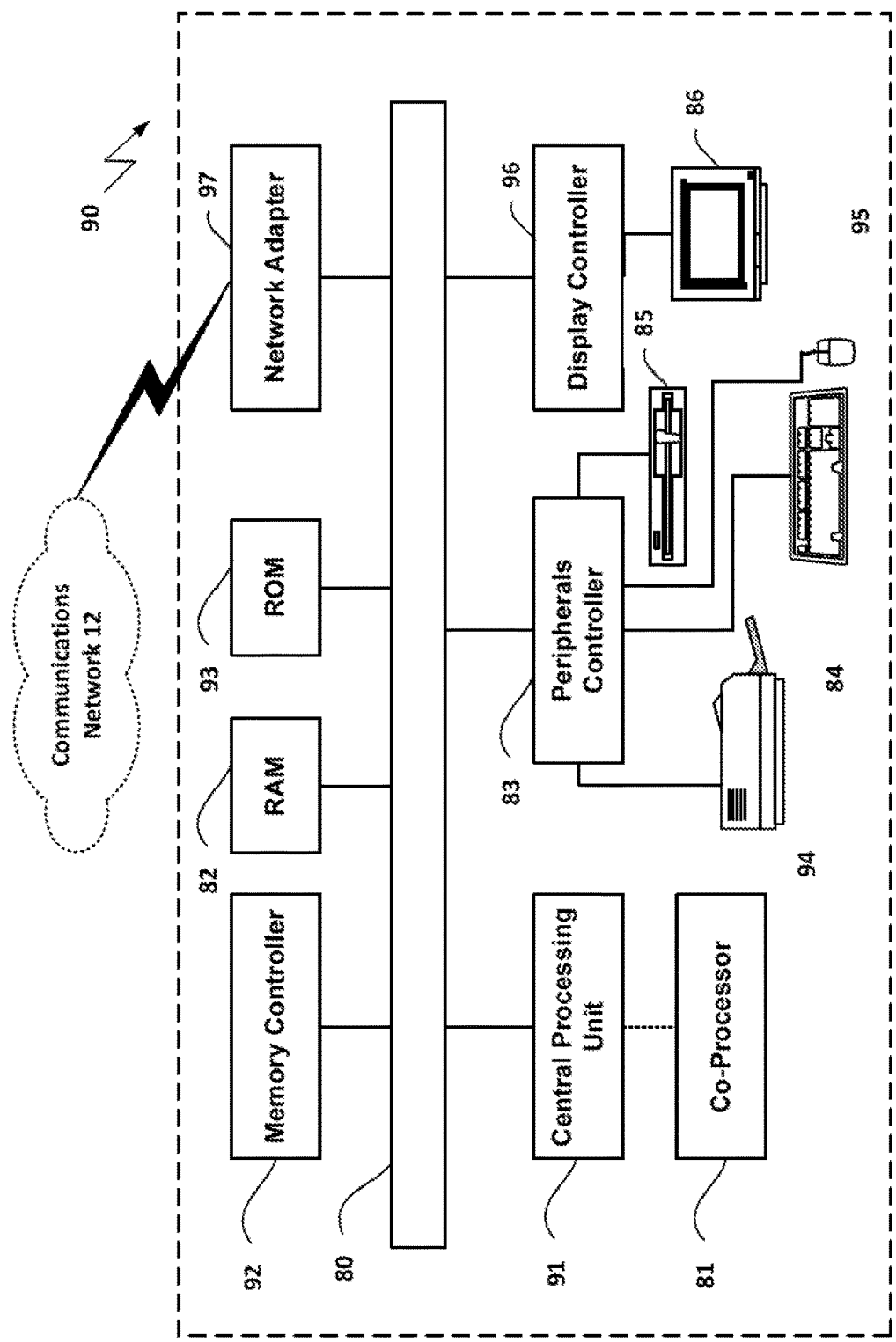
FIG. 32D is a block diagram of an example computing system in which a node or apparatus of the communication system of FIGS. 32A and 32B may be embodied.

FIG. 32D is a block diagram of an exemplary computing system 90 which may also be used to implement one or more nodes of a network, such as the clients, servers, or proxies illustrated in FIG. 1, 3-6, 8-12, 15, 16, 18, 20, or 22, and described herein, which may operate as an M2M server, gateway, device, or other node in an M2M network such as that illustrated in FIGS. 32A and 32B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25 and its accompanying description.

Further, computing system 90 may contain communication circuitry, such as for example a network adaptor 97, that may be used to connect computing system 90 to an external communications network, such as network 12 of FIG. 32A-D, to enable the computing system 90 to communicate with other apparatuses of the network. The communication circuitry, alone or in combination with the CPU 91, may be used to perform the transmitting and receiving steps described herein (e.g., in FIG. 1, 3, 5-8, 11-15, 20-21, 24, or 25) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service level technologies that may appear in the above description. Unless otherwise specified, the acronyms used herein refer to the corresponding term listed below.

ADN Application Dedicated Node
AE Application Entity
API Application Programming Interfaces
ASE Automated Service Enrollment
ASE-C Automated Service Enrollment Client
ASE-S Automated Service Enrollment Server
ASN Application Service Node
CSE Common Service Entity
CSF Common Service Function
IN Infrastructure Network
IoT Internet of Things
IP Internet Protocol
M2M Machine to Machine
MN Middle Node
NoDN Non-oneM2M Node
PoA Point of Access
ROA Resource Oriented Architecture
SL Service Layer
URI Uniform Resource Identifier This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus being connected to a communications network, the apparatus further including computer-executable instructions stored in the memory of the apparatus which, when executed by the processor of the apparatus, cause the apparatus to implement a service layer entity on the communications network and cause the service layer entity to:

receive an electronic profile comprising information concerning a service subscriber of a plurality of network devices that may be connected to the communications network, and information concerning each of the plurality of network devices, the information concerning each network device comprising at least an associated identifier of the network device, an identifier of each of one or more applications hosted on the network device, and an associated data control policy for each of the one or more applications comprising one or more allowed data types;

create, in the memory of the service layer entity, one or more resources and store within the one or more resources the information contained in the electronic profile concerning the service subscriber and concerning each of the plurality of network devices, including the associated identifiers of each of the one or more applications hosted on each said network device, and the associated data control policy of each of the one or more applications hosted on each said network device;

receive, from an application hosted on each said network device connected to the communications network, an electronic request to register the application with the service layer entity, the request comprising a first identifier and a first data type of data the requesting application is configured to transmit on the communications network;

determine, based on the one or more resources, that the first identifier of the requesting application matches an associated identifier of one of the plurality of applications in the electronic profile;

determine, based on the one or more resources, that the first data type of the requesting application matches one of the allowed data types of the associated data control policy of the application having the matching identifier in the electronic profile;

register, based on the determinations, the requesting application with the service layer entity;

create one or more access control policies based on one or more access control privileges defined in the electronic profile;

link the access control policies to resources created by the registered application; and determine a plurality of applications allowed to access the resources based on the privileges defined in the access control policies.

2. The apparatus of claim 1, wherein the instructions further cause the service layer entity to:

determine the requesting application produces a second data type;

determine the second data type does not match one or more of the allowed data types of the associated data control policy of the application having the matching identifier in the electronic profile; and prevent the requesting application from registering.

3. The apparatus of claim 1, wherein the electronic profile further comprises at least one of: one or more authorized users; one or more selected service enrollment electives; one or more specified access privileges; and one or more service enrollment lifetimes.

4. The apparatus of claim 1, wherein an allowed data type of the one or more allowed data types comprises at least one of: one or more supported types of resources; one or more supported types of schemas; maximum number of instances of data; and maximum number of bytes of data.

5. The apparatus of claim 1, wherein the instructions further cause the service layer entity to:
- determine the identifier of the device upon which the requesting application is hosted;
- determine the device identifier does not match one or more allowed device identifiers associated with the application in the electronic profile; and
- prevent the requesting application from registering.

6. The apparatus of claim 1, wherein the instructions further cause the service layer entity to:
- determine a plurality of users allowed to access the resources based on the privileges defined in the access control policies.

7. The apparatus of claim 1, wherein the instructions further cause the service layer entity to:
- create one or more data control policies based on one or more data control privileges defined in the electronic profile;
- link the data control policies to one or more resources created by the registered application; and
- determine at least one of a maximum number of child resource instances or a maximum number of bytes allowed to be stored in a resource, based on the data control policies.

8. The apparatus of claim 1, wherein the instructions further cause the service layer entity to:
- create one or more data control policies based on one or more data control privileges defined in the electronic profile;
- link the data control policies to one or more resources created by the registered application; and
- determine one or more data schemas allowed to be stored in a resource based on the data control policies.

9. The apparatus of claim 1, wherein the electronic profile is received from an enrollment function in the communications network.

10. A method performed by a service layer entity of a communications network, comprising:
- receiving an electronic profile comprising information concerning a service subscriber of a plurality of network devices that may be connected to the communications network, and information concerning each of the plurality of network devices, the information concerning each network device comprising at least an associated identifier of the network device, an identifier of each of one or more applications hosted on the network device, and an associated data control policy for each of the one or more applications comprising one or more allowed data types;
- creating, in a memory of the service layer entity, one or more resources and storing within the one or more resources the information contained in the electronic profile concerning the service subscriber and concerning each of the plurality of network devices, including the associated identifiers of each of the one or more applications hosted on each said network device, and the associated data control policy of each of the one or more applications hosted on each said network device;
- receiving, from an application hosted on each said network device connected to the communications network, an electronic request to register the application with the service layer entity, the request comprising a first identifier and a first data type of data the requesting application is configured to transmit on the communications network;
- determining, based on the one or more resources, that the first identifier of the requesting application matches an associated identifier of one of the plurality of applications in the electronic profile;
- determining, based on the one or more resources, that the first data type of the requesting application matches one of the allowed data types of the associated data control policy of the application having the matching identifier in the electronic profile;
- registering, based on the determinations, the requesting application with the service layer entity;
- creating one or more access control policies based on one or more access control privileges defined in the electronic profile;
- linking the access control policies to resources created by the registered application; and
- determining a plurality of applications allowed to access the resources based on the privileges defined in the access control policies.

11. The method of claim 10, further comprising:
- determining the requesting application produces a second data type;
- determining the second data type does not match one or more of the allowed data types of the associated data control policy of the application having the matching identifier in the electronic profile; and
- preventing the requesting application from registering.

12. The method of claim 10, wherein the electronic profile further comprises at least one of: one or more authorized users; one or more selected service enrollment electives; one or more specified access privileges; and one or more service enrollment lifetimes.

13. The method of claim 10, wherein an allowed data type of the one or more allowed data types comprises at least one of: one or more supported types of resources; one or more supported types of schemas; maximum number of instances of data; and maximum number of bytes of data.

14. The method of claim 10, further comprising:
- determining the identifier of the device upon which the requesting application is hosted;
- determining the device identifier does not match one or more allowed device identifiers associated with the application in the electronic profile; and
- preventing the requesting application from registering.

15. The method of claim 10, further comprising:
- determining a plurality of users allowed to access the resources based on the privileges defined in the access control policies.

16. The method of claim 10, further comprising:
- creating one or more data control policies based on one or more data control privileges defined in the electronic profile;
- linking the data control policies to one or more resources created by the registered application; and
- determining at least one of a maximum number of child resource instances or a maximum number of bytes allowed to be stored in a resource, based on the data control policies.

17. The method of claim 10, further comprising:
- creating one or more data control policies based on one or more data control privileges defined in the electronic profile;
- linking the data control policies to one or more resources created by the registered application; and
- determining one or more data schemas allowed to be stored in a resource based on the data control policies.

18. The method of claim 10, wherein the electronic profile is received from an enrollment function in the communications network.

\* \* \* \* \*